US008951627B2

(12) United States Patent
Ogawa

(10) Patent No.: US 8,951,627 B2
(45) Date of Patent: Feb. 10, 2015

(54) FLUORESCENT FINE PARTICLE FILMS AND DISPLAY DEVICES

(75) Inventor: Kazufumi Ogawa, Awa (JP)

(73) Assignee: Empire Technology Development LLC, Wilmington, DE (US)

(*) Notice: Subject to any disclaimer, the term of this patent is extended or adjusted under 35 U.S.C. 154(b) by 1202 days.

(21) Appl. No.: 12/663,082

(22) PCT Filed: Jun. 5, 2008

(86) PCT No.: PCT/JP2008/060397
§ 371 (c)(1),
(2), (4) Date: Apr. 27, 2010

(87) PCT Pub. No.: WO2008/149954
PCT Pub. Date: Dec. 11, 2008

(65) Prior Publication Data
US 2011/0014416 A1 Jan. 20, 2011

(30) Foreign Application Priority Data

Jun. 6, 2007 (JP) .................................. 2007-150850

(51) Int. Cl.
B32B 5/16 (2006.01)
H01J 9/227 (2006.01)
C09K 11/02 (2006.01)
H01J 29/20 (2006.01)

(52) U.S. Cl.
CPC . *H01J 9/227* (2013.01); *B32B 5/16* (2013.01); *C09K 11/025* (2013.01); *H01J 29/20* (2013.01); *H01J 2211/42* (2013.01); *H01J 2329/20* (2013.01)
USPC .......................................... 428/206; 428/207

(58) Field of Classification Search
USPC .................. 428/195.1, 206, 207; 252/301.35, 252/301.36
See application file for complete search history.

(56) References Cited

U.S. PATENT DOCUMENTS

| 4,701,789 A | 10/1987 | Boyne |
| 2003/0099859 A1 | 5/2003 | Liu et al. |
| 2010/0178473 A1 | 7/2010 | Ogawa |
| 2010/0183880 A1 | 7/2010 | Ogawa |

FOREIGN PATENT DOCUMENTS

| JP | 08053666 | 2/1996 |
| JP | 2001-226669 | 8/2001 |
| JP | 2003-168606 | 6/2003 |
| JP | 2005-158634 | 6/2005 |
| JP | 2006-008454 | 1/2006 |
| JP | 2007-117827 | 5/2007 |
| JP | 2007-118276 | 5/2007 |
| JP | 2007-119545 | 5/2007 |
| JP | 2007-126332 | 5/2007 |

OTHER PUBLICATIONS

U.S. Appl. No. 12/663,060, Feb. 25, 2013, Office Action.
U.S. Appl. No. 12/663,078, Dec. 24, 2012, Notice of Allowance.
(Continued)

*Primary Examiner* — Gerard Higgins
(74) *Attorney, Agent, or Firm* — Workman Nydegger

(57) ABSTRACT

A patterned fluorescent fine particle film that retains the intrinsic functions of fluorescent fine particles and that can be formed on any substrate at a desired thickness, a method for manufacturing the patterned fluorescent fine particle film, and a display apparatus including the patterned fluorescent fine particle film are provided.

18 Claims, 6 Drawing Sheets

(56) References Cited

OTHER PUBLICATIONS

U.S. Appl. No. 12/663,078, May 15, 2013, Issue Notification.
International Search Report with Written Opinion for International Application No. PCT/JP2008/060365 mailed Sep. 16, 2008.
International Search Report with Written Opinion for International Application No. PCT/JP2008/060368 mailed Sep. 16, 2008.
U.S. Appl. No. 12/663,060, Nov. 8, 2012, Office Action.
U.S. Appl. No. 12/663,078, Apr. 27, 2012, Office Action.
U.S. Appl. No. 12/663,078, Sep. 11, 2012, Notice of Allowance.
International Search Report and Written Opinion for International Patent Application No. PCT/JP2008/060397 mailed Aug. 26, 2008.
U.S. Appl. No. 12/663,060, Aug. 26, 2013, Final Office Action.

(A)

(B)

(A)

(B)

(A)

(B)

(A)

REPRESENTS  $E-(CH_2)_m-Si\begin{matrix}-O-\\-O-\\-O-\end{matrix}$.

(B)

REPRESENTS MOLECULES WHOSE EPOXY GROUPS UNDERWENT RING-OPENING POLYMERIZATION.

(A)

(B)

FLUORESCENT FINE PARTICLE FILMS AND DISPLAY DEVICES

BACKGROUND

Fluorescent paste has been widely used in the manufacture of a fluorescent fine particle film for use in display apparatuses, such as cathode-ray tubes (CRTs) and plasma display panels (PDPs), illuminators, such as fluorescent lamps, X-ray intensifying screens, and luminous substances.

Fluorescent paste contains fluorescent fine particles, a solvent, and a binder resin. After the fluorescent paste is applied on a substrate, and the solvent is removed, a fluorescent fine particle film is formed by sintering (see, for example, Patent Document 1) or curing of the binder resin (see, for example, Patent Document 2).

[Patent Document 1] Japanese Unexamined Patent Application Publication No. 2001-226669.

[Patent Document 2] U.S. Patent Application Publication No. 2003/0099859.

However, as in a light-emitting diode described in Patent Document 2, the remaining binder resin in a fluorescent fine particle film reduces the content rate of fluorescent fine particles, thus lowering the luminous efficiency. As a fluorescent film described in Patent Document 1, when the fluorescent fine particle film is formed by sintering, although the density of fluorescent fine particles in the fluorescent film can be high, the manufacturing efficiency is low, and the substrate requires heat resistance.

Furthermore, in conventional methods using fluorescent paste, it is difficult to control the thickness of a fluorescent fine particle film at a fluorescent fine particle size level.

SUMMARY

A fluorescent fine particle film, a method for manufacturing the fluorescent fine particle film, and a display apparatus including the fluorescent fine particle film are now described.

Accordingly, a fluorescent fine particle film can be formed in a pattern that retains the intrinsic functions of fluorescent fine particles, and can be formed on any substrate at a desired thickness. A method for manufacturing the fluorescent fine particle film formed in a pattern is described as well as a display apparatus including the fluorescent fine particle film formed in a pattern.

A fluorescent fine particle film can include a fluorescent fine particle layer which: includes fluorescent fine particles arranged only in a pattern portion of a surface of a substrate; and is bound and fixed to the substrate. A film of a first film compound is formed in the pattern portion of the surface of the substrate. A molecule of the first film compound has a first functional group at one end and is bound to the surface of the pattern portion at the other end. A film of a second film compound is formed on the surface of each of the fluorescent fine particles. A molecule of the second film compound has a second functional group at one end and is bound to the surface of the corresponding fluorescent fine particle at the other end. The fluorescent fine particles are fixed on the substrate via bonds formed by coupling reactions between a first coupling agent and the first and second functional groups. The first coupling agent has at least one first coupling reactive group and at least one second coupling reactive group. The first coupling reactive group undergoes a coupling reaction with the corresponding first functional group, and the second coupling reactive group undergoes a coupling reaction with the corresponding second functional group.

The term "coupling reaction", as used herein, refers to any reaction resulting from an addition reaction or a condensation reaction between functional groups and may be a thermal reaction or a photoreaction.

In the fluorescent fine particle film, a film of a third film compound may be further formed on the surface of each of the fluorescent fine particles. A hydrocarbon or fluorocarbon group of the third film compound is bound to the second functional group.

In a fluorescent fine particle film, the second functional group may be deactivated.

The term "deactivation", as used herein, means that a functional group or a coupling reactive group is converted into another functional group that does not react with the corresponding coupling reactive group or functional group. For example, when a first functional group is converted, by a reaction with a group other than a first coupling reactive group, into another functional group that does not react with the first coupling reactive group, the first functional group is "deactivated". When a first coupling reactive group is converted, by a reaction with a group other than a first functional group, into another functional group that does not react with the first functional group, the first coupling reactive group is "deactivated".

In a fluorescent fine particle film, the first film compound can be identical with the second film compound.

In a fluorescent fine particle film, either one or both of the film formed of the first film compound and the film formed of the second film compound can be monomolecular films.

In a fluorescent fine particle film the bonds formed by the coupling reactions may be N—CH$_2$CH(OH) bonds formed by a reaction between an amino or imino group and an epoxy group.

In a fluorescent fine particle film can be formed in a pattern and has n fluorescent fine particle layers with fluorescent fine particles arranged only in a pattern portion of a surface of a substrate (n is an integer of 2 or more), such layers are sequentially layered in order on the substrate from the first layer to the n-th layer in a direction from the substrate side toward an air interface side. A film of a first film compound is formed in the pattern portion of the surface of the substrate. A molecule of the first film compound has a first functional group at one end and is bound to the surface of the patterned portion at the other end. A film of a second film compound is formed on the surface of each of the fluorescent fine particles in the first sublayer. A molecule of the second film compound has a second functional group at one end and is bound to the surface of the fluorescent fine particle at the other end. The surface of each of the fluorescent fine particles in an x-th fluorescent fine particle layer (x is an integer of 2≤x≤n) is coated with a film of an (x+1)-th film compound having an (x+1)-th functional group. The first layer of the fluorescent fine particle layer is fixed on the substrate via a bond formed by a coupling reaction between a first coupling agent and the first and second functional groups. The first coupling agent has at least one first coupling reactive group and at least one second coupling reactive group. The first coupling reactive group undergoes a coupling reaction with the corresponding first functional group, and the second coupling reactive group undergoes a coupling reaction with the second functional group. An (x−1) layer and an x layer of the fluorescent fine particle layer are bound to each other via: bonds formed by coupling reactions between an x-th coupling agent, and x-th functional group and x-th coupling reactive group; and a bond formed by a coupling reaction between the (x+1) functional group and the (x+1) coupling reactive group. The x-th coupling agent has at least one x-th coupling reactive group and at least one (x+1)-th coupling reactive group.

A film of an (n+2)-th film compound may be further formed on an n-th sublayer of the fluorescent fine particles. A hydrocarbon or fluorocarbon group of the (n+2)-th film compound is bound to the (n+1)-th functional group.

In a fluorescent fine particle film, an (n+1)-th functional group of an (n+1)-th film compound formed on the n-th sublayer of the fluorescent fine particle layer may be deactivated.

In a fluorescent fine particle film, the first to (n+1)-th film compounds can be identical with one another, and the first to n-th coupling agents can be identical with one another.

In a fluorescent fine particle film, all the films formed of the first to (n+1)-th film compounds can be monomolecular films.

In a fluorescent fine particle film, the bonds formed by the coupling reactions may be N—CH$_2$CH(OH) bonds formed by a reaction between an amino or imino group and an epoxy group.

In a method for manufacturing a fluorescent fine particle film, the fluorescent fine particle film include a fluorescent fine particle layer which: has fluorescent fine particles arranged only in a patterned portion of a surface of a substrate; and in bound and fixed to the substrate, the method comprising the steps of: A) applying a solution containing a first film compound on the substrate, the first film compound having a first functional group and a first bonding group at both ends of a molecule of the first film compound, thereby forming a bond between the first bonding group and the substrate to coat the substrate with a film formed of the first film compound; B) irradiating the coated substrate with an energy beam through a mask covering the pattern portion to leave the film formed of the first film compound only in the patter portion (patterning treatment); C) applying a solution containing a second film compound on the fluorescent fine particles, the second film compound having a second functional group and a second bonding group at both ends of a molecule of the second film compound, thereby forming a bond between the second bonding group and the fluorescent fine particle to coat the fluorescent fine particle with a film formed of the second film compound on the surface of the fluorescent fine particles; and D) bringing a first coupling agent having at least one first coupling reactive group and at least one second coupling reactive group into contact with the substrate that has been subjected to the patterning treatment and the fluorescent fine particles on which the film formed of the second film compound has been formed, thereby fixing the fluorescent fine particle layer consisting of the fluorescent fine particles on the substrate via bonds formed by coupling reactions between the first functional group and the first coupling reactive group and between the second functional group and the second coupling reactive group, and then removing unfixed fluorescent fine particles.

The method for manufacturing a fluorescent fine particle film may further include the step of forming a film of a third film compound on the fluorescent fine particle layer after step D. A hydrocarbon or fluorocarbon group of the third film compound is bound to the second functional group.

The method for manufacturing a fluorescent fine particle film further include the step of deactivating the second functional group after step D.

In a method for manufacturing a fluorescent fine particle film, the patterning treatment in step B may be performed by removing the film of the first film compound by a laser ablation method.

In a method for manufacturing a fluorescent fine particle film, the patterning treatment in step B may be performed by converting the first functional group to another functional group by the energy beam irradiation.

In a method for manufacturing a fluorescent fine particle film, in step D, the first coupling agent may be brought into contact with the substrate that has been subjected to the patterning treatment to further selectively form a film of the first coupling agent only on the surface of the pattern portion via a bond formed by a coupling reaction between the first functional group and the first coupling reactive group, and then the fluorescent fine particles on which the film of the second film compound has been formed may be brought into contact with the substrate on which the film of the first coupling agent has been formed to selectively fix the fluorescent fine particles only on the surface of the patterned portion via a bond formed by a coupling reaction between the second functional group and the second coupling reactive group.

In a method for manufacturing a fluorescent fine particle film, in step D, the first coupling agent may be brought into contact with the fluorescent fine particles on which the film of the second film compound has been formed to further form a film of the first coupling agent on the surface of each of the fluorescent fine particles via a bond formed by a coupling reaction between the second functional group and the second coupling reactive group, and then the fluorescent fine particles on which the film of the first coupling agent has been formed may be brought into contact with the substrate that has been subjected to the patterning treatment to selectively fix the fluorescent fine particles only on the surface of the pattern portion via a bond formed by a coupling reaction between the first functional group and the first coupling reactive group.

In a method for manufacturing a fluorescent fine particle film, the first film compound can be identical with the second film compound.

In a method for manufacturing a fluorescent fine particle film, in steps A and C, the unreacted first and second film compounds can be washed away, and the film formed of the first film compound on the substrate and the film formed of the second film compound on the fluorescent fine particles can be monomolecular films.

The method for manufacturing a fluorescent fine particle film, in which a first sublayer to an n-th sublayer (n is an integer of 2 or more) are sequentially layered on the substrate in order from the first layer to the n-th layer in a direction from a substrate side toward an air interface side, the method may further include the steps of: E) applying a solution containing a third film compound to the fluorescent fine particles, the third film compound having a third functional group and a third bonding group at both ends of a molecule of the third film compound, thereby forming a bond between the third bonding group and the fluorescent fine particle to form a film of the third film compound on the fluorescent fine particle, and then bringing a second coupling agent into contact with the fluorescent fine particles on which the film of the third film compound has been formed, the second coupling agent having the second coupling reactive group and at least one third coupling reactive group, thereby further forming a film of the second coupling agent, via a bond formed by a coupling reaction between the third functional group and the third coupling reactive group, on the surface of each of the fluorescent fine particles on which the film of the third film compound has been formed; F) bringing fluorescent fine particles on which the film of the second coupling agent has been formed into contact with fluorescent fine particles, of the surface layer of the fluorescent fine particle layer, on which the film of the second film compound has been formed, thereby fixing the fluorescent fine particles on which the film of the second coupling agent has been formed, via a bond formed by a coupling reaction between the second functional group and the second coupling reactive group, on the fluorescent fine particles on which the film of the second film compound has been formed, and then removing unfixed fluorescent fine particles on which the film of the second coupling agent has been formed; G) bringing fluorescent fine particles on which the film of the second film compound has been formed into contact with the fluorescent fine particles, of the surface layer of the fluorescent fine particle layer, on which the film of the second coupling agent has been formed, thereby fixing the fluorescent fine particles on which the film of the second film compound has been formed, via a bond formed by a coupling reaction between the second functional group and the second coupling reactive group, on the fluorescent fine particles on which the film of the second coupling agent has been formed, and then removing unfixed fluorescent fine particles on which the film of the second film compound has been formed; and H) repeatedly performing the steps F and G in this order to form the fluorescent fine particle film composed of n fluorescent fine particle layers. Depending on the value of n, the step H may be completed by the step F or G.

The method for manufacturing a fluorescent fine particle film may further include the step of forming a film of a fourth film compound on the fluorescent fine particle layer after step H. A hydrocarbon or fluorocarbon group of the fourth film compound can be bound to the corresponding second functional group or the second coupling reactive group.

The method for manufacturing a fluorescent fine particle film may further include the step of deactivating the second functional group or the second coupling reactive group after step H.

In a method for manufacturing a fluorescent fine particle film, the first to third film compounds can be identical with one another.

In a method for manufacturing a fluorescent fine particle film, in step E, the unreacted third film compound is washed away, and the film of the third film compound on the fluorescent fine particles can be a monomolecular film.

The method for manufacturing a fluorescent fine particle film, in which the first sublayer to the n-th sublayer (n is an integer of 2 or more) are sequentially layered on the substrate in this order in a direction from the substrate side toward an air interface side, the method may further include the steps of: E) applying a solution containing a third film compound on the fluorescent fine particles, the third film compound having the first functional group and the third bonding group at opposite ends of a molecule of the third film compound, thereby forming a bond between the third bonding group and the corresponding fluorescent fine particle to coat the fluorescent fine particle with a film formed of the third film compound; F) bringing fluorescent fine particles on which the film of the third film compound has been formed into contact with fluorescent fine particles, of the surface layer of the fluorescent fine particle layer, on which the film of the first coupling agent has been formed, thereby fixing the fluorescent fine particles on which the film of the third film compound has been formed, via a bond formed by a coupling reaction between the first functional group and the first coupling reactive group, on the fluorescent fine particles on which the film of the first coupling agent has been formed, and then removing unfixed fluorescent fine particles on which the film of the third film compound has been formed; G) bringing fluorescent fine particles on which the film of the first coupling agent has been formed into contact with the fluorescent fine particles, of the surface layer of the fluorescent fine particle layer, on which the film of the third film compound has been formed, thereby fixing the fluorescent fine particles on which the film of the first coupling agent has been formed, via a bond formed by a coupling reaction between the first functional group and the first coupling reactive group, on the fluorescent fine particles on which the film of the third film compound has been formed, and then removing unfixed fluorescent fine particles on which the film of the first coupling agent has been formed; and H) repeatedly performing steps F and G in this order to form the fluorescent fine particle film composed of n fluorescent fine particle layers. Depending on the value of n, step H may be completed by the step F or G.

The method for manufacturing a fluorescent fine particle film may further include the step of forming a film of a fourth film compound on the fluorescent fine particle layer after step H. A hydrocarbon or fluorocarbon group of the fourth film compound can be bound to the first functional group or the first coupling reactive group.

The method for manufacturing a fluorescent fine particle film may further include the step of deactivating the first functional group or the first coupling reactive group after step H.

In a method for manufacturing a fluorescent fine particle film, all the first and second film compounds or all the first to third compounds may be alkoxysilane compounds, and the solutions containing the first and second film compounds or the solutions containing the first to third compounds may further contain, as a condensation catalyst, at least one compound selected from the group consisting of carboxylic acid metal salts, carboxylate ester metal salts, carboxylic acid metal salt polymers, carboxylic acid metal salt chelates, titanate esters, and titanate ester chelates.

In a method for manufacturing a fluorescent fine particle film, all the first and second film compounds or all the first to third compounds may be alkoxysilane compounds, and the solutions containing the first and second film compounds or the solutions containing the first to third compounds may further contain, as a condensation catalyst, at least one compound selected from the group consisting of ketimine compounds, organic acids, aldimine compounds, enamine compounds, oxazolidine compounds, and aminoalkylalkoxysilane compounds.

In a method for manufacturing a fluorescent fine particle film, the solutions may further contain, as a promoter, at least one compound selected from the group consisting of ketimine compounds, organic acids, aldimine compounds, enamine compounds, oxazolidine compounds, and aminoalkylalkoxysilane compounds.

In a method for manufacturing a fluorescent fine particle film, the bonds formed by the coupling reactions may be $N-CH_2CH(OH)$ bonds formed by a reaction between an amino or imino group and an epoxy group.

A display apparatus can include fluorescent fine particle films as described.

In the display apparatus, the fluorescent fine particle film may include a fluorescent fine particle layer of red, green, and blue fluorescent fine particles arranged in a specific pattern.

A television receiver can include a display apparatus that has a fluorescent fine particle film.

In fluorescent fine particle films and methods for manufacturing a fluorescent fine particle film, a method for manufacturing a large-area fluorescent fine particle film formed in a pattern at low cost can be provided. The fluorescent fine particle film retains the intrinsic functions of fluorescent fine particles, can be formed on any substrate in any pattern at a desired thickness, and has a uniform thickness and reduced variations in quality.

Furthermore, since the fluorescent fine particle layer of arranged fluorescent is bound and fixed on a surface of a substrate, the fluorescent fine particle film has a high peel resistance.

Furthermore, since the fluorescent fine particle film is formed one layer by one layer via a bond formed by a coupling reaction, the thickness of the patterned fluorescent fine particle film can be easily controlled at a fluorescent fine particle size level.

In particular, since the film of the third film compound having no reactive functional group can be further formed on the fluorescent fine particles, a plurality of fluorescent fine particle films formed of fluorescent fine particles of, for example, different luminescent colors can be formed on different pattern portions of a single substrate.

In a fluorescent fine particle film, since the second functional group can be deactivated, a plurality of fluorescent fine particle films can be formed on different pattern portions of a single substrate.

In a fluorescent fine particle film, since the first film compound can be identical with the second film compound, the manufacturing costs can be reduced.

In a fluorescent fine particle film, since either one or both of the films formed of the first and second film compounds are monomolecular films, the intrinsic physical properties and functions of one or both of the substrate and the fluorescent fine particles can be maintained.

In a fluorescent fine particle film, since the bonds formed by the coupling reactions can be $N-CH_2CH(OH)$ bonds formed by a reaction between an amino or imino group and an epoxy group, a strong bond can be formed by heating.

In a fluorescent fine particle film, in the laminated fluorescent fine particle layer on the substrate, since the number of fluorescent fine particle layers and the material and the size of fluorescent fine particles in each fluorescent fine particle layer can be determined freely, the thickness, the luminescence properties, and the void ratio of the fluorescent fine particle layer can be controlled easily. Furthermore, the optimum film compound and coupling agent can be chosen on the basis of the material of each fluorescent fine particle layer.

In a fluorescent fine particle film, since the film of the (n+2)-th film compound having no reactive functional group is further formed on the surface of the fluorescent fine particles, a plurality of fluorescent fine particle films formed of fluorescent fine particles of, for example, different luminescent colors can be formed on different pattern portions of a single substrate.

In a fluorescent fine particle film, since the (n+1)-th functional group of the (n+1)-th film compound formed on the n-th layer of the fluorescent fine particle layer can be deactivated, a plurality of fluorescent fine particle films can be formed on different pattern portions of a single substrate.

In a fluorescent fine particle film, since the first to (n+1)-th film compounds can be identical with one another, and the first to n-th coupling agents can be identical with one another, the manufacturing costs can be further reduced.

In a fluorescent fine particle film, since all the films formed of the first to (n+1)-th film compounds are monomolecular films, the intrinsic physical properties and functions of the substrate and the fluorescent fine particles are maintained.

In a fluorescent fine particle film, since the bonds formed by the coupling reactions are $N-CH_2CH(OH)$ bonds formed by a reaction between an amino or imino group and an epoxy group, a strong bond can be formed by heating.

When a method for manufacturing a fluorescent fine particle film includes the step of further forming the film of the third film compound having no reactive functional group on the fluorescent fine particle layer after step D, a plurality of fluorescent fine particle films formed of fluorescent fine particles of, for example, different luminescent colors can be formed on different pattern portions of a single substrate.

When a method for manufacturing a fluorescent fine particle film includes the step of deactivating the second functional group of the second film compound formed on the n-th layer of the fluorescent fine particle layer after step D, a plurality of fluorescent fine particle films can be formed on different pattern portions of a single substrate.

In a method for manufacturing a fluorescent fine particle film, when the patterning treatment in step B is performed by removing a portion of the film of the first film compound other than the pattern portion by a laser ablation method, a fine pattern can be formed precisely.

In a method for manufacturing a fluorescent fine particle film, when the patterning treatment in step B is performed by converting the first functional group in a portion other than the pattern portion to another functional group by the energy beam irradiation, a fine pattern can be formed precisely.

In a method for manufacturing a fluorescent fine particle film, in step D, the first coupling agent can be brought into contact with the surface of the substrate that has been subjected to the patterning treatment to further selectively form a film of the first coupling agent only on the surface of the pattern portion via a bond formed by a coupling reaction between the first functional group and the first coupling reactive group, and then the fluorescent fine particles coated with the film of the second film compound is brought into contact with the substrate on which the film of the first coupling agent has been formed to selectively fix the fluorescent fine particles only on the surface of the pattern portion via a bond formed by a coupling reaction between the second functional group and the second coupling reactive group. Therefore, the fluorescent fine particles coated with the film of the second film compound can be fixed on the surface of the pattern portion by the coupling reaction between the second functional group and the second coupling reactive group without pretreatment of the fluorescent fine particles coated with the film formed of the second film compound.

In a method for manufacturing a fluorescent fine particle film, in step D, the first coupling agent is brought into contact with the fluorescent fine particles coated with the second film compound to further form a film of the first coupling agent on the surface of each of the fluorescent fine particles via a bond formed by a coupling reaction between the second functional group and the second coupling reactive group, and then the fluorescent fine particles on which the film of the first coupling agent has been formed are brought into contact with the substrate that has been subjected to the patterning treatment to selectively fix the fluorescent fine particles only on the surface of the pattern portion via a bond formed by a coupling reaction between the first functional group and the first coupling reactive group. Therefore, the fluorescent fine particles coated with the film formed of the second film compound can be fixed on the substrate coated with the film formed of the first film compound by the coupling reaction between the first functional group and the first coupling reactive group without pretreatment of the substrate coated with the film formed of the first film compound.

In a method for manufacturing a fluorescent fine particle film, when the first film compound is identical with the second film compound, the manufacturing costs can be reduced.

In a method for manufacturing a fluorescent fine particle film, when the films formed of the first and second film compounds are monomolecular films, the intrinsic physical properties and functions of the substrate and the fluorescent fine particles are maintained.

In a method for manufacturing a fluorescent fine particle film, when a fluorescent fine particle film having a desired thickness can be manufactured by using three types of film compounds and two types of coupling agents, the manufacturing costs can be reduced.

When a method for manufacturing a fluorescent fine particle film includes the step of forming the film of the fourth film compound having no reactive functional group on the fluorescent fine particle layer after step H, a plurality of fluorescent fine particle films formed of fluorescent fine particles of, for example, different luminescent colors can be formed on different pattern portions of a single substrate.

When a method for manufacturing a fluorescent fine particle film includes the step of deactivating the second functional group or the second coupling reactive group after step H, a plurality of fluorescent fine particle films can be formed on different pattern portions of a single substrate.

In a method for manufacturing a fluorescent fine particle film, when the first to third film compounds are identical with one another, the manufacturing costs can be further reduced.

In a method for manufacturing a fluorescent fine particle film, when the film formed of the third film compound is a monomolecular film, the intrinsic physical properties and functions of the substrate and the fluorescent fine particles are maintained.

In a method for manufacturing a fluorescent fine particle film, when a fluorescent fine particle film having a desired thickness can be manufactured by using three types of film compounds and one type of coupling agent, the manufacturing costs can be reduced.

In methods for manufacturing a fluorescent fine particle film, when the solutions containing the film compounds further contain, as a condensation catalyst, at least one compound selected from the group consisting of carboxylic acid metal salts, carboxylate ester metal salts, carboxylic acid metal salt polymers, carboxylic acid metal salt chelates, titanate esters, and titanate ester chelates, the preparation time of reactive fluorescent fine particles can be reduced, and thus the fluorescent fine particle film can be manufactured more efficiently.

In a method for manufacturing a fluorescent fine particle film, when the solutions containing the film compounds further contain at least one compound selected from the group consisting of ketimine compounds, organic acids, aldimine compounds, enamine compounds, oxazolidine compounds, and aminoalkylalkoxysilane compounds, the preparation time of reactive fluorescent fine particles can be reduced, and thus the fluorescent fine particle film can be manufactured more efficiently. In particular, when the solutions contain both these compounds and the above-mentioned condensation catalyst, the preparation time can be further reduced.

In a method for manufacturing a fluorescent fine particle film, when the bonds formed by the coupling reactions are $N-CH_2CH(OH)$ bonds formed by a reaction between an amino or imino group and an epoxy group, a strong bond can be formed by heating.

When display apparatuses include the fluorescent fine particle films, the display apparatuses have uniform screen brightness and reduced variations in quality, as well as high mechanical strength and excellent durability. Furthermore, the display area can easily be increased, and the film thickness can easily be controlled at a fluorescent fine particle size level.

In a display apparatus, when the fluorescent fine particle film includes a fluorescent fine particle layer of red, green, and blue fluorescent fine particles arranged in a specific pattern, a full-color display is available.

The television receiver can have uniform screen brightness and reduced variations in quality, as well as high mechanical strength and excellent durability. Furthermore, the display area can easily be increased, and a full-color display is also available.

BRIEF DESCRIPTION OF DRAWINGS

FIG. 3(A) illustrates the cross-sectional structure of the glass plate before a reaction, and FIG. 3(B) illustrates the cross-sectional structure of the glass plate on which a monomolecular film of a film compound having an epoxy group is formed.

FIG. 5(A) illustrates the cross-sectional structure of the fluorescent zinc sulfide fine particle before a reaction, and FIG. 5(B) illustrates the cross-sectional structure of the fluorescent zinc sulfide fine particle on which a monomolecular film of a film compound having an epoxy group is formed.

FIG. 6(A) illustrates the cross-sectional structure of a substrate and a red multilayer fluorescent fine particle film after the formation of the red multilayer fluorescent fine particle film, FIG. 6(B) illustrates the cross-sectional structure of the substrate, the red multilayer fluorescent fine particle film, and a green multilayer fluorescent fine particle film after the formation of the green multilayer fluorescent fine particle film, and FIG. 6(C) illustrates the cross-sectional structure of the substrate, the red multilayer fluorescent fine particle film, the green multilayer fluorescent fine particle film, and a blue multilayer fluorescent fine particle film after the formation of the blue multilayer fluorescent fine particle film.

The fluorescent films will be further described below by way of embodiments with reference to the accompanying drawings.

Figure 1:
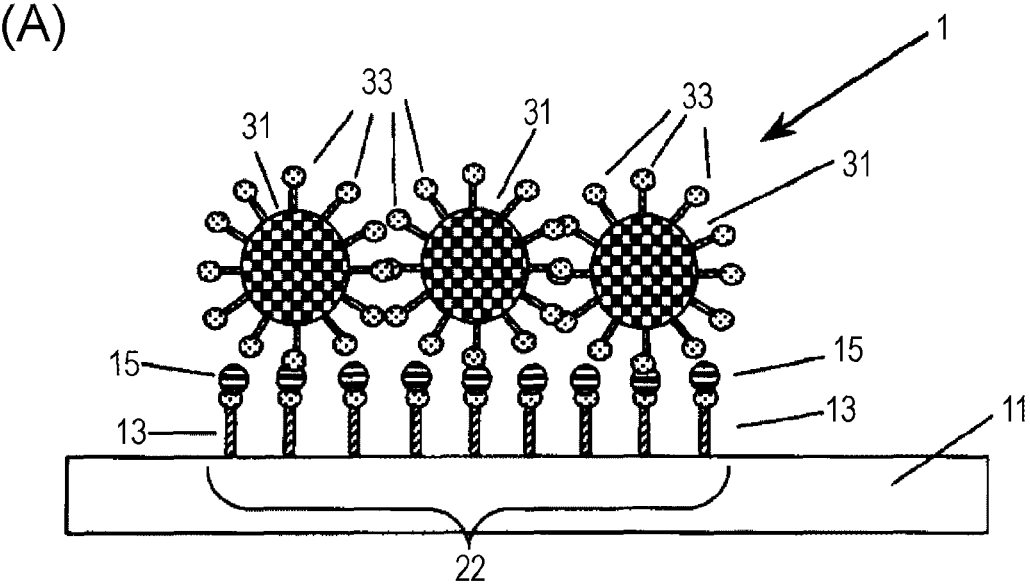
FIG. 1(A) is a schematic explanatory view of a cross-sectional structure of a monolayer fluorescent fine particle film formed in a pattern according to a first embodiment.
FIG. 1(B) is a schematic explanatory view of a cross-sectional structure of a multilayer fluorescent fine particle film formed in a pattern according to a second embodiment.
Figure 1:
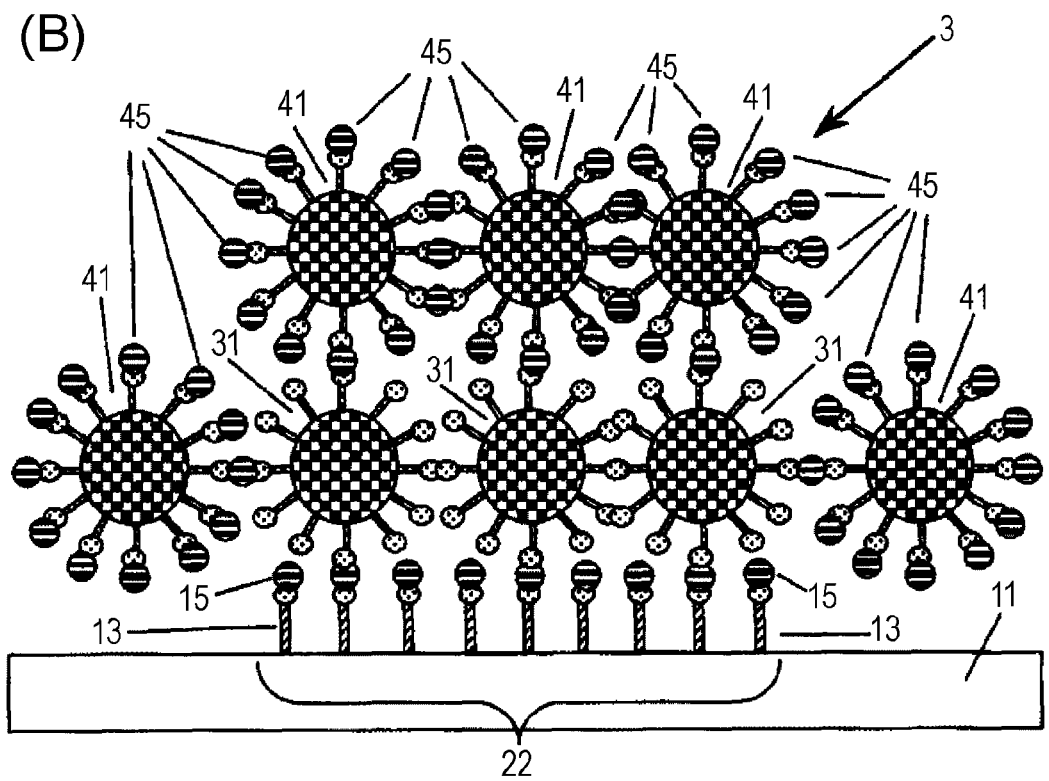
Figure 2:
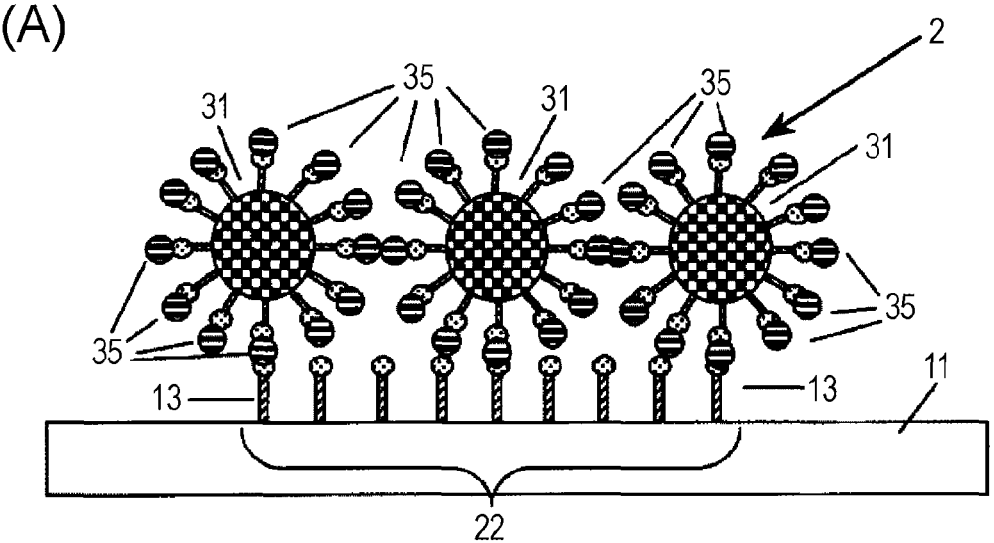
FIG. 2(A) is a schematic explanatory view of a cross-sectional structure of a monolayer fluorescent fine particle film formed in a pattern according to a third embodiment.
FIG. 2(B) is a schematic explanatory view of a cross-sectional structure of a multilayer fluorescent fine particle film formed in a pattern according to a fourth embodiment.
Figure 2:
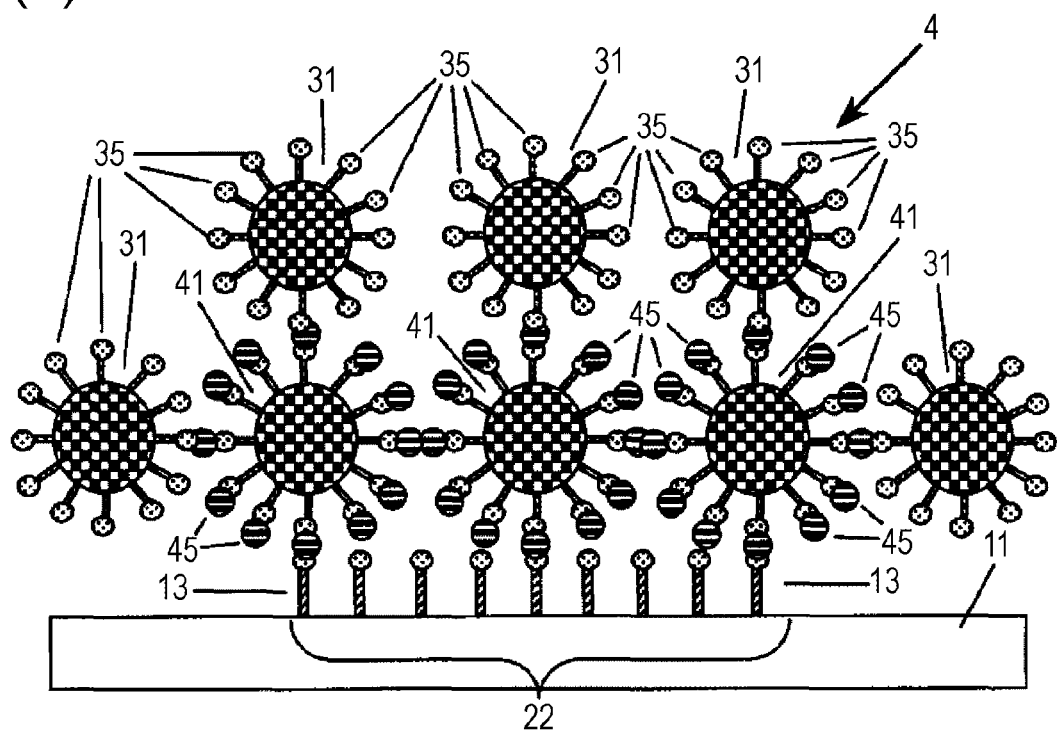

FIG. 1(A) is a schematic explanatory view of a cross-sectional structure of a monolayer fluorescent fine particle film formed in a pattern according to a first embodiment. FIG. 1(B) is a schematic explanatory view of a cross-sectional structure of a multilayer fluorescent fine particle film formed in a pattern according to a second embodiment. FIG. 2(A) is a schematic explanatory view of a cross-sectional structure of a monolayer fluorescent fine particle film formed in a pattern according to a third embodiment. FIG. 2(B) is a schematic explanatory view of a cross-sectional structure of a multilayer fluorescent fine particle film formed in a pattern according to a fourth embodiment. FIGS. 3(A) and 3(B) are schematic views enlarged to a molecular level to illustrate the step of forming a film of a first film compound on a glass plate in methods for manufacturing a fluorescent fine particle film formed in a pattern according to the first to fourth embodiments. FIG. 3(A) illustrates the cross-sectional structure of the glass plate before a reaction. FIG. 3(B) illustrates the cross-sectional structure of the glass plate on which a monomolecular film of a film compound having an epoxy group is formed. FIG. 4(A) is a schematic view enlarged to a molecular level to illustrate the step of performing patterning treatment in the methods for manufacturing a fluorescent fine particle film. FIG. 4(B) is a schematic view enlarged to a molecular level to illustrate the step of performing patterning treatment according to a modification. FIGS. 5(A) and 5(B) are schematic views enlarged to a molecular level to illustrate the step of forming a film of a second film compound on a fluorescent zinc sulfide fine particle in methods for manufacturing a fluorescent fine particle film according to the first to fourth embodiments. FIG. 5(A) illustrates the cross-sectional structure of the fluorescent zinc sulfide fine particle before a reaction. FIG. 5(B) illustrates the cross-sectional structure of the fluorescent zinc sulfide fine particle on which a monomolecular film of a film compound having an epoxy group is formed.

As illustrated in FIG. 1(A), a monolayer fluorescent fine particle film 1 is a fluorescent fine particle film formed in a pattern in which fluorescent zinc sulfide fine particles 31 (an example of fluorescent fine particles) are arranged only in a pattern portion of a surface of a glass plate 11 (an example of a substrate) to form a fluorescent fine particle layer.

A monomolecular film 13 of a first film compound (an example of a film) is formed in a pattern portion of the surface of the glass plate 11. A molecule of the first film compound has an epoxy group (an example of a first functional group) at one end and is bound to the surface of the pattern portion at the other end. A 2-methylimidazole monomolecular film 15 (an example of a film) is formed on the monomolecular film 13. 2-methylimidazole (an example of a first coupling agent) has one amino group and one imino group (examples of a first and second coupling reactive groups), which undergo a coupling reaction with an epoxy group to form a bond. The 2-methylimidazole monomolecular film 15 is fixed on the monomolecular film 13 via a bond formed by the coupling reaction between the amino group and the epoxy group.

A monomolecular film 33 of a second film compound (an example of a film) is formed on the surface of the fluorescent zinc sulfide fine particles 31. A molecule of the second film compound has an epoxy group (an example of a second functional group) at one end and is bound to the surface of the fluorescent zinc sulfide fine particle 31.

The glass plate 11 and the fluorescent zinc sulfide fine particles 31 are bound to each other via a bond formed by the coupling reaction between the epoxy group and the amino or imino group of 2-methylimidazole.

As illustrated in FIGS. 3(A), 3(B), 4(A), 5(A), 5(B), and 1(A), a method for manufacturing a monolayer fluorescent fine particle film 1 includes the steps of: A) applying a solution containing an alkoxysilane compound (an example of a first film compound) having an epoxy group on the surface of the glass plate 11 to form a bond between an alkoxysilyl group (an example of a first bonding group) and a hydroxyl group 12 of the surface of the glass plate 11, thereby forming a monomolecular film 13 of the first film compound on the glass plate 11 (see FIG. 3); B) irradiating the monomolecular film 13 of the first film compound with light (an example of energy radiation) through a mask 21 covering a pattern portion to leave epoxy groups only in the pattern portion 22 (patterning treatment; see FIG. 4); C) bringing an alkoxysilane compound (an example of a second film compound) having an epoxy group into contact with fluorescent zinc sulfide fine particles 31 to form a bond between an alkoxysilyl group (an example of a second bonding group) and a hydroxyl group 32 of the surface of the fluorescent zinc sulfide fine particles 31, thereby forming a monomolecular film 33 of the second film compound on the surface of the fluorescent zinc sulfide fine particles 31 (see FIG. 5); and D) bringing 2-methylimidazole into contact with the patterned glass plate 11 to selectively form a 2-methylimidazole monomolecular film 15 only on the surface of the pattern portion 22 through a coupling reaction between an epoxy group and an amino group, then bringing the fluorescent zinc sulfide fine particles 31 on which the monomolecular film 33 of the second film compound has been formed into contact with the glass plate 11 on which the 2-methylimidazole monomolecular film 15 has been formed, thereby selectively fixing the fluorescent zinc sulfide fine particles 31 only on the surface of the pattern portion 22 via a bond formed by a coupling reaction between an epoxy group and an imino group (an example of a second coupling reactive group), and then removing unfixed fluorescent zinc sulfide fine particles 31.

The steps A to D will be described in detail below.

Figure 3:
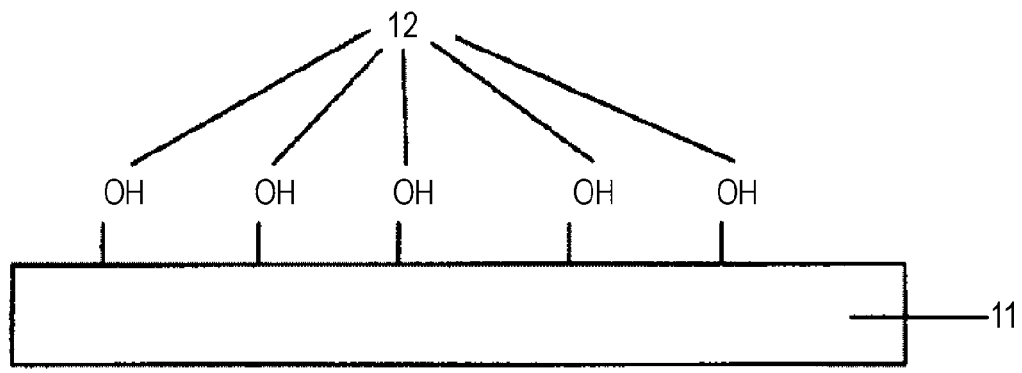
FIGS. 3(A) and 3(B) are schematic views that illustrates the step of forming a film of a first film compound on a glass plate in methods for manufacturing a fluorescent fine particle film formed in a pattern according to the first to fourth embodiments.
Figure 3:
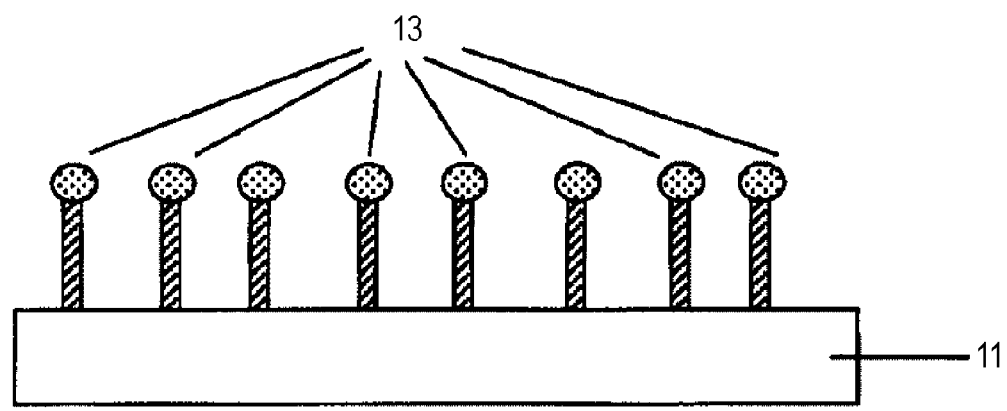
Figure 3:

In step A, a film compound having an epoxy group is brought into contact with the glass plate 11 to form the monomolecular film 13 of the first film compound (see FIG. 3).

The glass plate 11 may be of any size.

The film compound having an epoxy group may be any compound that can be adsorbed on or bound to the surface of the glass plate 11 to form a monomolecular film by self-organization. The film compound having an epoxy group is a straight-chain alkylene group having a functional group containing an epoxy group (oxirane ring) at one end and an alkoxysilyl group (an example of a first bonding group) at the other end, that is, an alkoxysilane compound having the following general formula (Chemical formula 1):

E-(CH$_2$)$_m$—Si(OR)$_3$  [Chemical formula 1]

wherein E can be a functional group having an epoxy group, m can be an integer of 3 to 20, and R denotes an alkyl group having 1 to 4 carbon atoms.

Specific examples of the film compound having an epoxy group include the following alkoxysilane compounds (1) to (12).

(1) (CH$_2$OCH)CH$_2$O(CH$_2$)$_3$Si(OCH$_3$)$_3$
(2) (CH$_2$OCH)CH$_2$O(CH$_2$)$_7$Si(OCH$_3$)$_3$
(3) (CH$_2$OCH)CH$_2$O(CH$_2$)$_{11}$Si(OCH$_3$)$_3$
(4) (CH$_2$CHOCH(CH$_2$)$_2$)CH(CH$_2$)$_2$Si(OCH$_3$)$_3$
(5) (CH$_2$CHOCH(CH$_2$)$_2$)CH(CH$_2$)$_4$Si(OCH$_3$)$_3$
(6) (CH$_2$CHOCH(CH$_2$)$_2$)CH(CH$_2$)$_6$Si(OCH$_3$)$_3$
(7) (CH$_2$OCH)CH$_2$O(CH$_2$)$_3$Si(OC$_2$H$_5$)$_3$ (8) $(CH_2OCH)CH_2O(CH_2)_7Si(OC_2H_5)_3$
(9) $(CH_2OCH)CH_2O(CH_2)_{11}Si(OC_2H_5)_3$
(10) $(CH_2CHOCH(CH_2)_2)CH(CH_2)_2Si(OC_2H_5)_3$
(11) $(CH_2CHOCH(CH_2)_2)CH(CH_2)_4Si(OC_2H_5)_3$
(12) $(CH_2CHOCH(CH_2)_2)CH(CH_2)_6Si(OC_2H_5)_3$

The (CH$_2$OCH)CH$_2$O— group is a functional group represented by Chemical formula 2 (glycidyloxy group), and the (CH$_2$CHOCH(CH$_2$)$_2$)CH— group is a functional group represented by Chemical formula 3 (3,4-epoxycyclohexyl group).

[Chemical formula 2]

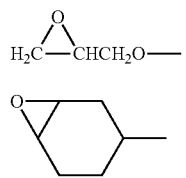

[Chemical formula 3]

The monomolecular film 13 of the first film compound on the glass plate 11 is formed by applying a reaction solution that contains an alkoxysilane compound having an epoxy group and an alkoxysilyl group (an example of a second bonding group), a condensation catalyst that promotes a condensation reaction between the alkoxysilyl group and a hydroxyl group 12 on a surface of the glass plate 11, and a nonaqueous organic solvent on the glass plate 11 and carrying out reaction at room temperature in the air. The reaction solution can be applied by any method, including a doctor blade method, a dip coating method, a spin coating method, a spray method, and a screen printing method.

Examples of the condensation catalyst include metal salts, such as carboxylic acid metal salts, carboxylate ester metal salts, carboxylic acid metal salt polymers, carboxylic acid metal salt chelates, titanate esters, and titanate ester chelates.

The additive amount of the condensation catalyst ranges from 0.2% to 5% by mass or 0.5% to 1% by mass of the alkoxysilane compound.

Specific examples of carboxylic acid metal salts include tin(II) acetate, dibutyltin dilaurate, dibutyltin dioctate, dibutyltin diacetate, dioctyltin dilaurate, dioctyltin dioctate, dioctyltin diacetate, tin(II) dioctanoate, lead naphthenate, cobalt naphthenate, and 2-ethylhexanoic acid iron salt.

Specific examples of carboxylate ester metal salts include a dioctyltin bis(octylthioglycolic acid ester) salt and a dioctyltin maleate salt.

Specific examples of carboxylic acid metal salt polymers include a dibutyltin maleate polymer and a dimethyltin mercaptopropionate polymer.

Specific examples of carboxylic acid metal salt chelates include dibutyltin bis(acetylacetate) and dioctyltin bis(acetyllaurate).

Specific examples of titanate esters include tetrabutyl titanate and tetranonyl titanate.

Specific examples of titanate ester chelates include bis(acetylacetonyl)dipropyl titanate.

The condensation reaction occurs between an alkoxysilyl group and a hydroxyl group 12 of the surface of the glass plate 11, yielding the monomolecular film 13 of the film compound having an epoxy group having the structure represented by Chemical formula 4. Three single bonds of oxygen atoms are bound to an silicon (Si) atom of the surface of the glass plate 11 or an adjacent silane compound. At least one of the three single bonds is bound to a silicon atom on the surface of the glass plate 11.

[Chemical formula 4]

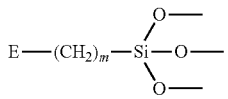

Since an alkoxysilyl group decomposes in the presence of water, the reaction is performed in the air at a relative humidity of 45% or less. The condensation reaction is inhibited by oil and fat or water on the surface of the glass plate 11. Thus, the glass plate 11 is previously washed and dried to remove these impurities.

In the presence of any of the metal salt condensation catalysts described above, the condensation reaction time is about two hours.

When in place of the above-mentioned metal salt, at least one compound selected from the group consisting of ketimine compounds, organic acids, aldimine compounds, enamine compounds, oxazolidine compounds, and aminoalkylalkoxysilane compounds is used as a condensation catalyst, the reaction time can be reduced to half to two thirds.

Using these compounds as promoters, together with the metal salt described above (at a mass ratio in the range of 1:9 to 9:1, or about 1:1), the reaction time can be further reduced.

For example, using a ketimine compound H3 from Japan Epoxy Resins Co., Ltd. in place of a carboxylic acid metal salt chelate dibutyltin bis(acetylacetate) as a condensation catalyst under the same conditions in manufacturing fluorescent epoxidized zinc sulfide fine particles 21, the reaction time can be reduced to about one hour without compromising the quality of the fluorescent epoxidized zinc sulfide fine particles 21.

Furthermore, using a mixture (at a mixture ratio of 1:1) of H3 from Japan Epoxy Resins Co., Ltd. and dibutyltin bis(acetylacetonate) as a condensation catalyst under the same conditions in forming the monomolecular film 13 of the first film compound, the reaction time can be reduced to about 20 min.

The ketimine compound used herein may be, but not limited to, 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, or 2,4,20,22-tetramethyl-5,12,19-triaza-4,19-trieicosadiene.

The organic acid used herein may be, but not limited to, formic acid, acetic acid, propionic acid, butyric acid, or malonic acid.

The reaction solution may be manufactured using an organochlorine solvent, a hydrocarbon solvent, a fluorocarbon solvent, a silicone solvent, and a mixed solvent thereof. The solvent is dried with a drying agent or by distillation to prevent hydrolysis of an alkoxysilane compound. The solvent can have a boiling point in the range of from 50° C. to 250° C.

Specific examples of the solvent include nonaqueous petroleum naphtha, solvent naphtha, petroleum ether, petroleum benzine, isoparaffin, normal paraffin, decalin, industrial gasoline, nonane, decane, heating oil, dimethyl silicone, phenyl silicone, alkyl-modified silicone, polyether silicone, and dimethylformamide.

Additional examples of the solvent include alcohol solvents, such as methanol, ethanol, and propanol, and mixtures thereof.

Examples of the fluorocarbon solvent include chlorofluorocarbon solvents, Fluorinert (from 3M Co., USA) and Afluid (from Asahi Glass Co., Ltd.). These fluorocarbon solvents may be used alone or in combination of two or more if they are miscible with each other. Furthermore, an organochlorine solvent, such as dichloromethane or chloroform, may be added.

The concentration of the alkoxysilane compound in the reaction solution ranges from 0.5% to 3% by mass.

After the reaction, the glass plate 11 is washed with a solvent to remove the unreacted alkoxysilane compound and condensation catalyst, thus producing an epoxidized glass plate 14 coated with the monomolecular film 13 of a film compound having an epoxy group. FIG. 3(B) is a schematic view of the cross-sectional structure of the epoxidized glass plate 14 thus produced.

The washing solvent may be any solvent that can dissolve the alkoxysilane compound. The washing solvent is dichloromethane, chloroform, or N-methylpyrrolidone because these solvents are inexpensive, can dissolve the alkoxysilane well, and are easy to remove by air drying.

If the glass plate 11 is not washed with a solvent and is left in the air after the reaction, part of the alkoxysilane compound remaining on the surface is hydrolyzed by water in the air, and the resulting silanol group causes a condensation reaction with an alkoxysilyl group. This results in the formation of an ultrathin polysiloxane polymer film on the epoxidized glass plate 14. Although this polymer film is not necessarily entirely fixed on the glass plate 11 by a covalent bond, the polymer film has an epoxy group and therefore has the same reactivity as the monomolecular film 13 of the first film compound. Thus, even if the glass plate 11 is not washed with a solvent, there is no particular problem in the manufacturing process after step B.

While an alkoxysilane compound having an epoxy group is used in the present embodiment, a straight-chain alkylene group having an amino group at one end and an alkoxysilyl group at the other end, that is, an alkoxysilane compound represented by the following general formula (Chemical formula 5) may be used.

The coupling agent that reacts with an imino or amino group may be a coupling agent having a glycidyl group at both ends.

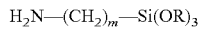

[Chemical formula 5]

In Chemical formula 5, m can be an integer of 3 to 20, and R can be an alkyl group having 1 to 4 carbon atoms.

Specific examples of the film compound having an amino group include the following alkoxysilane compounds (21) to (28).

(21) $H_2N(CH_2)_3Si(OCH_3)_3$
(22) $H_2N(CH_2)_5Si(OCH_3)_3$
(23) $H_2N(CH_2)_7Si(OCH_3)_3$
(24) $H_2N(CH_2)_9Si(OCH_3)_3$
(25) $H_2N(CH_2)_3Si(OC_2H_5)_3$
(26) $H_2N(CH_2)_5Si(OC_2H_5)_3$
(27) $H_2N(CH_2)_7Si(OC_2H_5)_3$
(28) $H_2N(CH_2)_9Si(OC_2H_5)_3$

However, in this case, among the condensation catalysts used in the reaction solution, compounds containing a tin (Sn) salt react with an amino group and form a precipitate. Thus, these compounds cannot be used as condensation catalysts for alkoxysilane compounds having an amino group.

When an alkoxysilane compound having an amino group is used, therefore, the same compounds as in the case of the alkoxysilane compounds having an epoxy group other than carboxylic acid tin salts, carboxylate tin salts, carboxylic acid tin salt polymers, and carboxylic acid tin salt chelates can be used alone or in combination as condensation catalysts.

The type of promoter, the combination of promoters, the type of solvent, the concentrations of the alkoxysilane compound, the condensation catalyst, and the promoter, the reaction conditions, and the reaction time are the same as in the case using alkoxysilane compounds having an epoxy group and will not be further described.

While the glass substrate is used as a substrate in the present embodiment, when a substrate has an active hydrogen group, such as a hydroxyl group or an amino group, on the surface thereof, the film compound may be an alkoxysilane compound. Specific examples of such a substrate include ceramics, porcelain enamel, transparent electrodes, such as indium tin oxide (ITO), metal sheets, such as aluminum sheets, copper sheets, aluminum sheets and silicon wafers.

When a synthetic resin is used as the substrate material, an alkoxysilane compound can be used as the film compound by, for example, grafting of a compound having an active hydrogen group by plasma processing.

While the silane compound that undergoes a condensation reaction with an active hydrogen group on the surface of the substrate is used as the film compound in the present embodiment, when a substrate having a gold plating layer is used, a thiol or triazinethiol derivative that forms a strong bond with a gold atom may be used as the film compound.

Figure 4:
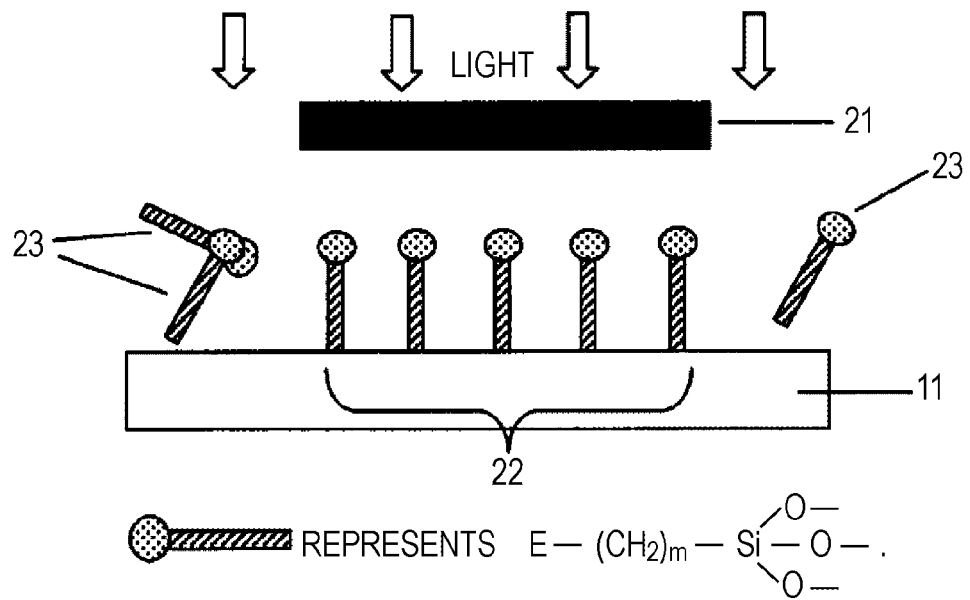
FIG. 4(A) is a schematic view to illustrate the step of performing patterning treatment in methods for manufacturing a fluorescent fine particle film according to the first to fourth embodiments.
FIG. 4(B) is a schematic view enlarged to a molecular level to illustrate the step of performing patterning treatment according to a modification.
Figure 4:
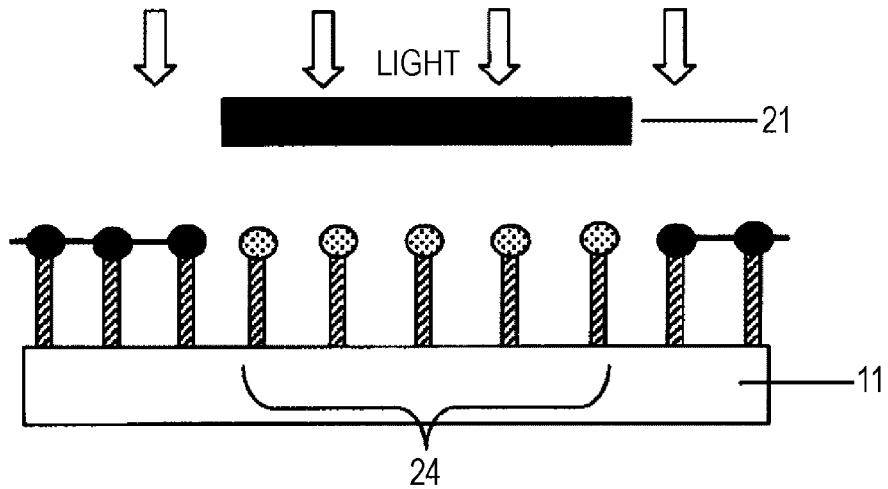

In step B, the glass plate 11 on which the monomolecular film 13 of the first film compound has been formed is exposed through a mask 21 covering the pattern portion to selectively leave a portion of the monomolecular film 13 of the first film compound in the pattern portion 22 by an ablation method (patterning treatment; see FIG. 4).

The exposure mask may be formed of any material that blocks light and that is resistant to light at least during exposure, for example, a material for a reticle for use in photolithography in the manufacture of semiconductor elements. The exposure may be a projection exposure at the same magnification or may be a projection exposure at a reduced magnification for fine patterning.

The light source can be a laser beam, for example, an excimer laser, such as XeF (353 nm), XeCl (308 nm), KrF (248 nm), or ArF (193 nm).

As illustrated in FIG. 4(A), laser beam irradiation increases the temperature of an irradiated portion, thus selectively removing the first film compound covering the irradiated portion (23 in FIG. 4). This leaves the monomolecular film 13 of the first film compound only in the pattern portion 22 (see FIG. 4(A)).

An epoxidized film compound is removed by a pulse laser ablation method using a pulse laser to prevent heat input in a portion other than the irradiated portion.

The laser beam intensity ranges from 0.1 to 0.3 J·cm$^{-2}$. A laser beam having an intensity below 0.1 J·cm$^{-2}$ cannot sufficiently remove a film compound having an epoxy group. A laser beam having an intensity above 0.3 J·cm$^{-2}$ removes the glass component of the epoxidized glass plate 14.

Within the laser beam intensity range described above, the pulse width ranges from 5 to 50 ns.

While the first film compound is removed by the pulse laser ablation method in the present embodiment, another energy radiation, such as an electron beam or X-rays, may be used. Instead of exposure through a mask, the monomolecular film 13 of the first film compound may be directly and selectively irradiated in a pattern with an electron beam to remove a portion of the first film compound other than a patter portion.

As illustrated in FIG. 4(B), in the step of performing patterning treatment according to a modification, after a photopolymerization initiator is applied to a monomolecular film 13 of a first film compound, the monomolecular film 13 of the first film compound is subjected to photoirradiation through a mask 21 covering a pattern portion to cause ring-opening polymerization of epoxy groups in the exposed portion, thus leaving the monomolecular film 13 of the first film compound only in the pattern portion 24 (patterning treatment).

Examples of the photopolymerization initiator include cationic photopolymerization initiators, such as diaryliodonium salts. Examples of the light source include a high-pressure mercury lamp and a xenon lamp.

In step C, the same film compound having an epoxy group as in the step A is brought into contact with fluorescent zinc sulfide fine particles 31 to form a monomolecular film 33 of a film compound having an epoxy group on the surface thereof.

The particle diameter of the fluorescent zinc sulfide fine particles 31 is not limited and ranges from 10 nm to 0.1 mm. When the particle diameter of the fluorescent zinc sulfide fine particles 31 is below 10 nm, the molecular size of the film compound is not as negligible. When the particle diameter of the fluorescent zinc sulfide fine particles 31 is above 0.1 mm, ratio of their mass to their surface area becomes so high that their mass cannot be supported by carrying out crosslinking reaction.

The monomolecular film 33 of the film compound having an epoxy group is formed by dispersing the fluorescent zinc sulfide fine particles 31 in a reaction solution that contains an alkoxysilane compound having an epoxy group, a condensation catalyst that accelerates a condensation reaction between an alkoxysilyl group and a hydroxyl group 32 of a surface of the fluorescent zinc sulfide fine particles 31, and a nonaqueous organic solvent, and carrying out a reaction at room temperature in the air.

The type of alkoxysilane compound having an epoxy group, the type of the condensation catalyst and the promoter, the combination of promoters, the type of solvent, the concentrations of the alkoxysilane compound, the condensation catalyst, and the promoter, the reaction conditions, and the reaction time in the step C are the same as in the step A and will not be further described.

After the reaction, the fluorescent zinc sulfide fine particles 31 are washed with a solvent to remove the unreacted alkoxysilane compound and condensation catalyst, thus producing the fluorescent zinc sulfide fine particles 31 on which the monomolecular film 33 of the film compound having an epoxy group has been formed, as illustrated in FIG. 5(B).

The washing solvent may be the same as in step A. If the fluorescent zinc sulfide fine particles 31 are not washed with a solvent and are left in the air after the reaction, part of the alkoxysilane compound remaining on the fluorescent zinc sulfide fine particles 31 is hydrolyzed by water in the air, and the resulting silanol group causes a condensation reaction with an alkoxysilyl group. This results in the formation of an ultrathin polysiloxane polymer film on the fluorescent epoxidized zinc sulfide fine particles 34. Although this polymer film is not fixed on the fluorescent zinc sulfide fine particles 31 by a covalent bond, the polymer film has an epoxy group and therefore has the same reactivity as the monomolecular film 33 of the second film compound. Thus, even if the fluorescent zinc sulfide fine particles 31 are not washed with a solvent, there is no particular problem in the manufacturing process after step D.

While an alkoxysilane compound having an epoxy group is used in the present embodiment, an alkoxysilane compound in which a straight-chain alkylene group has an amino group at one end and an alkoxysilyl group at the other end may be used, as in step A.

Furthermore, while the same alkoxysilane compound as in step A is used in the present embodiment, a different alkoxysilane compound may be used, provided that the alkoxysilane compound has a functional group that reacts with a coupling reactive group of the coupling agent used in step D to form a bond.

While the fluorescent zinc sulfide fine particles are used as fluorescent fine particles in the present embodiment, other fluorescent fine particles may be used. Examples of the fluorescent fine particles include fluorescent substances for plasma displays in which an impurity, such as a rare earth or manganese, is added to a base material, such as an oxide, a phosphorylated compound, or a halide; fluorescent substances for CRTs, such as ZnS:Ag, Cl, ZnS:Cu, Au, Al, and $Y_2O_2S$:Eu; fluorescent substances for radioluminescence, such as NaI; fluorescent substances for electroluminescence (EL) in which copper halide, Mn, or a rare earth is added as an active ingredient to a base material, such as ZnS, ZnCdS, CaS, or ZnSe; and CdS.

When fluorescent fine particles other than the fluorescent zinc sulfide fine particles have an active hydrogen group, such as a hydroxyl group or an amino group, on the surface thereof, an alkoxysilane compound can also be used as a film compound, as in the fluorescent zinc sulfide fine particles. For a fluorescent sulfide substance, a phosphine compound that can coordinate to a sulfur atom via a P—S bond may be used.

While the film compounds having an epoxy group are used as the first and second film compounds in the present embodiment, the first and second film compounds may be the same or different. The first and second film compounds may have different functional groups (for example, one has an epoxy group, and the other has an isocyanate group).

In step D, 2-methylimidazole is brought into contact with the surface of the glass plate 11 on which the monomolecular film 13 of the first film compound has been formed to form a 2-methylimidazole monomolecular film 15 on the surface of the glass plate 11 via a bond formed by a coupling reaction between an epoxy group and an amino group, then the fluorescent zinc sulfide fine particles 31 on which the monomolecular film 33 of the second film compound has been formed is brought into contact with the glass plate 11, thereby fixing the fluorescent zinc sulfide fine particles 31 on the glass plate 11 via a bond formed by a coupling reaction between an epoxy group and an imino group, and then unfixed fluorescent zinc sulfide fine particles 31 are removed.

2-methylimidazole has an amino group at position 1 and an imino group at position 3. These groups undergo crosslinking reactions with epoxy groups to form bonds, as shown by the following Chemical formula 6.

[Chemical formula 6]

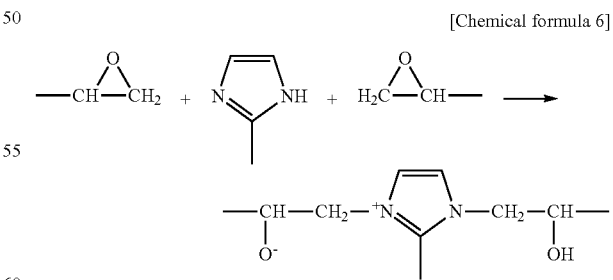

The 2-methylimidazole monomolecular film 15 is formed by applying a reaction solution containing 2-methylimidazole and a solvent on the monomolecular film 13 of the first film compound on the surface of the glass plate 11 and allowing 2-methylimidazole to react by heating. The reaction solution can be applied by any method, including a doctor blade method, a dip coating method, a spin coating method, a spray method, and a screen printing method.

In manufacturing a film precursor, any solvent that dissolves 2-methylimidazole can be used. Lower alcohol solvents, such as isopropyl alcohol and ethanol, are preferred in terms of cost, volatility at room temperature, and toxicity.

The additive amount of 2-methylimidazole, the concentration of the reaction solution, the reaction temperature, and the reaction time are appropriately determined on the basis of the types of the substrate and the fluorescent fine particles, the thickness of the fluorescent fine particle film, and other factors.

After the reaction, the glass plate 11 is washed with a solvent to remove unreacted 2-methylimidazole. Thus, the 2-methylimidazole monomolecular film 15 is formed via a bond formed by the reaction between the epoxy group and the amino group of 2-methylimidazole.

A dispersion liquid of the fluorescent zinc sulfide fine particles 31 on which the monomolecular film 33 of the second film compound has been formed is applied to the glass plate 11 thus obtained on which the 2-methylimidazole monomolecular film 15 has been formed. The fluorescent zinc sulfide fine particles 31 are bound and fixed on the surface of the glass plate 11 via a bond formed by a coupling reaction between the epoxy group and the imino group of 2-methylimidazole by heating. Thus, a monolayer fluorescent fine particle film 1 having a monolayer fluorescent fine particle layer is produced.

The heating temperature ranges from 100° C. to 200° C. At a heating temperature below 100° C., the coupling reaction takes a long period of time. At a heating temperature above 200° C., the monomolecular films 13 and 33 having an epoxy group and the 2-methylimidazole monomolecular film 15 decompose, and therefore a uniform monolayer fluorescent fine particle film 1 cannot be formed.

After the reaction, the glass plate 11 is washed with a solvent, such as water or alcohol, to remove unfixed fluorescent zinc sulfide fine particles 31.

While 2-methylimidazole is used as a coupling agent in the present embodiment, an imidazole derivative represented by the following Chemical formula 7 may be used.

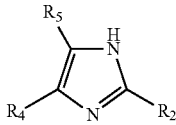

[Chemical formula 7]

Specific examples of the imidazole derivative represented by Chemical formula 7 include the following imidazole derivatives (31) to (38).
(31) 2-methylimidazole ($R_2$=Me, $R_4$=$R_5$=H)
(32) 2-undecylimidazole ($R_2$=$C_{11}H_{23}$, $R_4$=$R_5$=H)
(33) 2-pentadecylimidazole ($R_2$=$C_{15}H_{31}$, $R_4$=$R_5$=H)
(34) 2-methyl-4-ethylimidazole ($R_2$=Me, $R_4$=Et, $R_5$=H)
(35) 2-phenylimidazole ($R_2$=Ph, $R_4$=$R_5$=H)
(36) 2-phenyl-4-ethylimidazole ($R_2$=Ph, $R_4$=Et, $R_5$=H)
(37) 2-phenyl-4-methyl-5-(hydroxymethyl)imidazole ($R_2$=Ph, $R_4$=Me, $R_5$=$CH_2OH$)
(38) 2-phenyl-4,5-bis(hydroxymethyl)imidazole ($R_2$=Ph, $R_4$=$R_5$=$CH_2OH$)

Me, Et, and Ph can be a methyl group, an ethyl group, and a phenyl group, respectively.

In addition to the imidazole derivatives, heterocyclic compounds containing at least two nitrogens, such as melamine, isocyanuric acid, triazine, barbituric acid, parabanic acid, uracil, and thymine, may be used. Imidazole-metal complexes may also be used.

A compound used as a curing agent for an epoxy resin, for example, an acid anhydride, such as phthalic anhydride or maleic anhydride, dicyandiamide, and a phenol derivative, such as novolak, may also be used as a coupling agent. In this case, an imidazole derivative may be used as a catalyst to accelerate the coupling reaction.

While the film compound has an epoxy group as a functional group in the present embodiment, when the film compound has an amino or imino group as a functional group, a coupling agent having two or more epoxy or isocyanate groups as coupling reactive groups is used. Specific examples of the compound having isocyanate groups include hexamethylene-1,6-diisocyanate, toluene-2,6-diisocyanate, and toluene-2,4-diisocyanate.

The amounts of these diisocyanate compounds range from 5% to 15% by weight of the fluorescent epoxidized zinc sulfide fine particles, as in the case of 2-methylimidazole. In this case, a solvent used in manufacturing a film precursor may be an aromatic solvent, such as xylene.

When a film compound having an imino or amino group is used, a compound having two or more epoxy groups, such as ethylene glycol diglycidyl ether, may also be used as a crosslinker.

As illustrated in FIG. 1(B), in a multilayer fluorescent fine particle film 3, the first fluorescent fine particle layer to the n-th fluorescent fine particle layer (n is an integer of 2 or more; in the present embodiment, n=2) are sequentially layered on a glass plate 11 in this order in a direction from the glass substrate 11 side toward an air interface side.

A monomolecular film 13 of a first film compound that has an epoxy group at one end of a molecule of the first film compound is formed on the glass plate 11. A 2-methylimidazole monomolecular film 15 is disposed on the monomolecular film 13 via a bond formed by a coupling reaction between an amino group of 2-methylimidazole and the epoxy group.

A monomolecular film 33 of a second film compound that has an epoxy group at one end of a molecule of the second film compound is formed on each surface of fluorescent zinc sulfide fine particles 31 of the first fluorescent fine particle layer.

A monomolecular film 43 (an example of a film) of a third film compound that has an epoxy group (an example of a third functional group) at one end of a molecule of the third film compound is formed on each surface of fluorescent zinc sulfide fine particles 41 of a second fluorescent fine particle layer. A 2-methylimidazole monomolecular film 45 (an example of a film) is further formed on the monomolecular film 43 via a bond formed by a coupling reaction between an amino group (an example of a third coupling reactive group) of 2-methylimidazole (an example of a third coupling agent) and the epoxy group.

The glass plate 11 and the fluorescent zinc sulfide fine particles 31 of the first fluorescent fine particle layer, and the fluorescent zinc sulfide fine particles 31 of the first fluorescent fine particle layer and the fluorescent zinc sulfide fine particles 41 of the second fluorescent fine particle layer are bound to each other via a bond formed by a coupling reaction between the epoxy group and an amino or imino group of 2-methylimidazole.

As illustrated in FIG. 1(B), the fluorescent zinc sulfide fine particles 41 on which the 2-methylimidazole monomolecular film 45 is formed can also be bound to the lateral sides of the fluorescent zinc sulfide fine particles 31 of the first fluorescent fine particle layer. However, this rarely disarranges the shape of the pattern. In FIG. 1(B), the size of the fluorescent fine particles is exaggerated for purposes of illustration relative to the actual pattern size.

As illustrated in FIGS. 3(A), 3(B), 4(A), 5(A), 5(B), and 1(A), a method for manufacturing a multilayer fluorescent fine particle film 3 includes the steps of: A) applying a solution containing an alkoxysilane compound having an epoxy group on the glass plate 11 to form a bond between an alkoxysilyl group (an example of a first bonding group) and a hydroxyl group 12 of the surface of the glass plate 11, thereby forming a monomolecular film 13 of the first film compound on the glass plate 11 (see FIG. 3); B) irradiating the monomolecular film 13 of the first film compound with light through a mask 21 covering a pattern portion to leave epoxy groups only in the pattern portion 22 (patterning treatment; see FIG. 4); C) bringing an alkoxysilane compound having an epoxy group into contact with the fluorescent zinc sulfide fine particles 31 to form a bond between an alkoxysilyl group and a hydroxyl group 32 of the surface of the fluorescent zinc sulfide fine particles 31, thereby forming a monomolecular film 33 of the second film compound on the fluorescent zinc sulfide fine particles 31 (see FIG. 5); D) as illustrated in FIG. 3(B), bringing 2-methylimidazole into contact with the patterned glass plate 11 to selectively form a 2-methylimidazole monomolecular film 15 only on the surface of the pattern portion 22 through a coupling reaction between an epoxy group and an amino group, then bringing the fluorescent zinc sulfide fine particles 31 on which the monomolecular film 13 of the first film compound has been formed into contact with the glass plate 11 on which the 2-methylimidazole monomolecular film 15 has been formed, thereby selectively fixing the fluorescent zinc sulfide fine particles 31 only on the surface of the pattern portion 22 via a bond formed by a coupling reaction between an epoxy group and an imino group, and then removing unfixed fluorescent zinc sulfide fine particles 31; E) applying a solution containing an alkoxysilane compound having an epoxy group on the surface of the fluorescent zinc sulfide fine particles 41 to form a bond between an alkoxysilyl group (an example of a third bonding group) and a hydroxyl group of the surface of the fluorescent zinc sulfide fine particles 41, thereby forming a monomolecular film 43 of a third film compound on the fluorescent fine particles 41, and then bringing 2-methylimidazole (an example of a second coupling agent) into contact with the surface of the monomolecular film 43 of the third film compound to further form a monomolecular film 45 (an example of a film) formed of 2-methylimidazole that is fixed thereon via a bond formed by a coupling reaction between an epoxy group (an example of a third functional group) and an amino group; F) bringing the fluorescent zinc sulfide fine particles 41 on which the 2-methylimidazole monomolecular film 45 has been formed into contact with the surface of the fluorescent zinc sulfide fine particles 31, of the surface layer of the fluorescent fine particle layer, on which the monomolecular film 33 of the second film compound has been formed, thereby binding and fixing the fluorescent zinc sulfide fine particles 41 on which the 2-methylimidazole monomolecular film 45 has been formed on a fluorescent fine particle layer of the fluorescent zinc sulfide fine particles 31 on which the monomolecular film 33 of the second film compound has been formed via a bond formed by a coupling reaction between an epoxy group and an imino group, and then removing unfixed fluorescent zinc sulfide fine particles 41; and G) bringing the fluorescent zinc sulfide fine particles 31 on which the monomolecular film 33 of the second film compound has been formed into contact with the surface of the fluorescent zinc sulfide fine particles 41, of the surface layer of the fluorescent fine particle layer, on which the 2-methylimidazole monomolecular film 45 has been formed to form a bond by a coupling reaction between an epoxy group and an imino group, thereby binding and fixing the fluorescent zinc sulfide fine particles 31 on which the monomolecular film 33 of the second film compound has been formed, on the fluorescent fine particle layer of the fluorescent zinc sulfide fine particles 41 on which the 2-methylimidazole monomolecular film 45 has been formed, and then removing unfixed fluorescent zinc sulfide fine particles 31.

The steps A to D are the same as in the method for manufacturing a monolayer fluorescent fine particle film 1 and therefore will not be further described.

In step E, a solution containing an alkoxysilane compound having an epoxy group is brought into contact with the fluorescent zinc sulfide fine particles 41 to form a bond between an alkoxysilyl group and a hydroxyl group of the surface of the fluorescent zinc sulfide fine particles 41, thereby forming a monomolecular film 43 of a third film compound on the fluorescent zinc sulfide fine particles 41, and then 2-methylimidazole is brought into contact with the monomolecular film 43 of the third film compound to further form a monomolecular film 45 (an example of a film) formed of 2-methylimidazole fixed via a bond formed by a coupling reaction between an epoxy group and an amino group.

The concentration of the 2-methylimidazole solution, the reaction conditions, and other factors are the same as in the case where the 2-methylimidazole monomolecular film 15 is formed on the glass plate 11 in step D, except that the fluorescent zinc sulfide fine particles 31 are dispersed in a solution and heated, instead of applying the solution. Thus, these factors will not be further described. Other coupling agents that can be used are also the same as in step D.

While the film compound having an epoxy group is used as the third film compound in the present embodiment, the third film compound may be the same as or different from either one or both of the first and second film compounds. The third film compound may have a functional group different from those of the first and second film compounds (for example, an amino group).

In step F, the fluorescent zinc sulfide fine particles 41 on which the 2-methylimidazole monomolecular film 45 is brought into contact with the surface of the fluorescent zinc sulfide fine particles 31, of the surface layer of the fluorescent fine particle layer, on which the monomolecular film 33 of the second film compound has been formed, thereby binding and fixing the fluorescent zinc sulfide fine particles 41 on which the 2-methylimidazole monomolecular film 45 has been formed on the fluorescent fine particle layer of the fluorescent zinc sulfide fine particles 31 on which the monomolecular film 33 of the second film compound has been formed via a bond formed by a coupling reaction between an epoxy group and an imino group, and then unfixed fluorescent zinc sulfide fine particles 41 are removed.

In step G, the fluorescent zinc sulfide fine particles 31 on which the monomolecular film 33 of the second film compound has been formed are brought into contact with the surface of the fluorescent zinc sulfide fine particles 41, of the surface layer of the fluorescent fine particle layer, on which the 2-methylimidazole monomolecular film 45 is formed to form a bond by coupling reaction between a epoxy group and imino group, thereby fixing the fluorescent zinc sulfide fine particles 31 on which the monomolecular film 33 of the second film compound has been formed on the fluorescent fine particle layer of the fluorescent zinc sulfide fine particles 41 on which the 2-methylimidazole monomolecular film 45 has been formed, and then unfixed fluorescent zinc sulfide fine particles 31 are removed.

The reaction conditions in the steps F and G are the same as in step E and will not be further described.

In the present embodiment, while the preparation of a fluorescent fine particle film that includes two fluorescent fine particle layers has been described, step H in which steps F and G are performed repeatedly to form a fluorescent fine particle film that includes n fluorescent fine particle layers (n is an integer of 2 or more) may be further performed. The step H may be completed by the step F or G.

As illustrated in FIG. 2(A), a monolayer fluorescent fine particle film 3 is a fluorescent fine particle film formed in a pattern in which fluorescent zinc sulfide fine particles 31 are arranged only in a pattern portion of a surface of a glass plate 11 to form a fluorescent fine particle layer.

A monomolecular film 13 of a first film compound is formed on the pattern portion of the surface of the glass plate 11. The first film compound has an epoxy group at one end of a molecule of the first film compound and is bound to the surface of the pattern portion at the other end. A monomolecular film 33 of a second film compound is formed on each surface of the fluorescent zinc sulfide fine particles 31. The second film compound has an epoxy group at one end of a molecule of the second film compound and is bound to the surface of the fluorescent zinc sulfide fine particles 31. A monomolecular film 35 of 2-methylimidazole, which has one amino group and one imino group that undergo a coupling reaction with an epoxy group to form a bond, is formed on the surface of the monomolecular film 33 via a bond formed by a coupling reaction between the amino group of 2-methylimidazole and an epoxy group.

The glass plate 11 and the fluorescent zinc sulfide fine particles 31 are bound and fixed to each other via a bond formed by the coupling reaction between the epoxy group and the amino or imino group of 2-methylimidazole.

As illustrated in FIGS. 3(A), 3(B), 4(A), 5(A), 5(B), and 2(A), a method for manufacturing a monolayer fluorescent fine particle film 2 includes the steps of: A) applying a solution containing an alkoxysilane compound (an example of a first film compound) having an epoxy group on the glass plate 11 to form a bond between an alkoxysilyl group (an example of a first bonding group) and a hydroxyl group 12 of the surface of the glass plate 11, thereby forming a monomolecular film 13 of the first film compound on the glass plate 11 (see FIG. 3); B) irradiating the monomolecular film 13 of the first film compound with light (an example of energy radiation) through a mask 21 covering a pattern portion to leave epoxy groups only in the pattern portion 22 (patterning treatment; see FIG. 4); C) bringing an alkoxysilane compound (an example of a second film compound) having an epoxy group into contact with the fluorescent zinc sulfide fine particles 31 to form a bond between an alkoxysilyl group (an example of a second bonding group) and a hydroxyl group 32 of the surface of the fluorescent zinc sulfide fine particles 31, thereby forming a monomolecular film 33 of the second film compound on the fluorescent zinc sulfide fine particles 31 (see FIG. 5); and D) bringing 2-methylimidazole into contact with the fluorescent zinc sulfide fine particles 31 on which the monomolecular film 33 of the second film compound has been formed to form a 2-methylimidazole monomolecular film 35 on the surface of the monomolecular film 33 of the second film compound via a bond formed by a coupling reaction between an epoxy group and an amino group, then bringing the fluorescent zinc sulfide fine particles 31 on which the 2-methylimidazole monomolecular film 35 has been formed into contact with the glass plate 11 on which the monomolecular film 13 of the first film compound has been formed only in the pattern portion 22, thereby selectively fixing the fluorescent zinc sulfide fine particles 31 only on the surface of the pattern portion 22 via a bond formed by a coupling reaction between an epoxy group and an imino group (an example of a second coupling reactive group), and then removing unfixed fluorescent zinc sulfide fine particles 31.

As illustrated in FIG. 2(B), in a multilayer fluorescent fine particle film 4, the first fluorescent fine particle layer to an n-th fluorescent fine particle layer (n is an integer of 2 or more; in the present embodiment, n=2) are sequentially layered on a glass plate 11 in this order in a direction from the substrate 11 side towards an air interface side.

A monomolecular film 13 of a first film compound that has an epoxy group at one end of a molecule of the first film compound is formed on a glass plate 11.

A monomolecular film 33 of a second film compound that has an epoxy group at one end of a molecule of the second film compound is formed on each surface of fluorescent zinc sulfide fine particles 31 of a first fluorescent fine particle layer. A 2-methylimidazole monomolecular film 35 is further formed on the surface of the monomolecular film 33 via a bond formed by a coupling reaction between an amino group of 2-methylimidazole and the epoxy group.

A monomolecular film 43 (an example of a film) of a third film compound that has an epoxy group (an example of a first functional group) at one end of a molecule of the third film compound is formed on each surface of fluorescent zinc sulfide fine particles 41 of a second fluorescent fine particle layer.

The glass plate 11 and the fluorescent zinc sulfide fine particles 31 of the first fluorescent fine particle layer, and the fluorescent zinc sulfide fine particles 31 of the first fluorescent fine particle layer and the fluorescent zinc sulfide fine particles 41 of the second fluorescent fine particle layer are bound and fixed to each other via a bond formed by a coupling reaction between the epoxy group and an amino or imino group of 2-methylimidazole.

As illustrated in FIG. 2(B), the fluorescent zinc sulfide fine particles 41 on which the monomolecular film 45 of the third film compound is formed can also be bound to the lateral sides of the fluorescent zinc sulfide fine particles 31 on which the 2-methylimidazole monomolecular film 35 has been formed in the first fluorescent fine particle layer. However, this rarely impairs the shape of the pattern in reality. In FIG. 2(B), the size of the fluorescent fine particles are exaggerated for purposes of illustration relative to the actual pattern size.

As illustrated in FIGS. 3(A), 3(B), 4(A), 5(A), 5(B), and 2(B), a method for manufacturing a multilayer fluorescent fine particle film 4 includes the steps of: A) applying a solution containing an alkoxysilane compound having an epoxy group on the glass plate 11 to form a bond between an alkoxysilyl group and a hydroxyl group 12 of the surface of the glass plate 11, thereby forming a monomolecular film 13 of the first film compound on the glass plate 11 (see FIG. 3); B) irradiating the monomolecular film 13 of the first film compound with light through a mask 21 covering a pattern portion to leave epoxy groups only in the pattern portion 22 (patterning treatment; see FIG. 4); C) bringing an alkoxysilane compound having an epoxy group into contact with the surface of fluorescent zinc sulfide fine particles 31 to form a bond between an alkoxysilyl group and a hydroxyl group 32 of the surface of the fluorescent zinc sulfide fine particles 31, thereby forming a monomolecular film 33 of the second film compound on the fluorescent zinc sulfide fine particles 31

Figure 5:
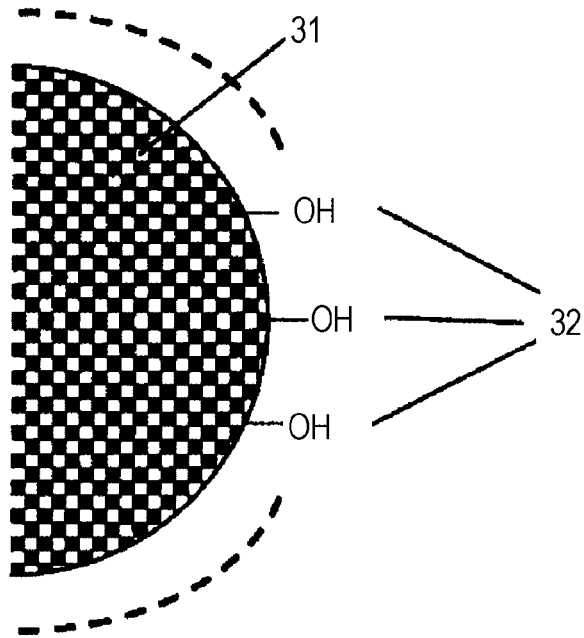
FIGS. 5(A) and 5(B) are schematic views to illustrate the step of forming a film of a second film compound on a fluorescent zinc sulfide fine particle in methods for manufacturing a fluorescent fine particle film according to the first to fourth embodiments.
Figure 5:
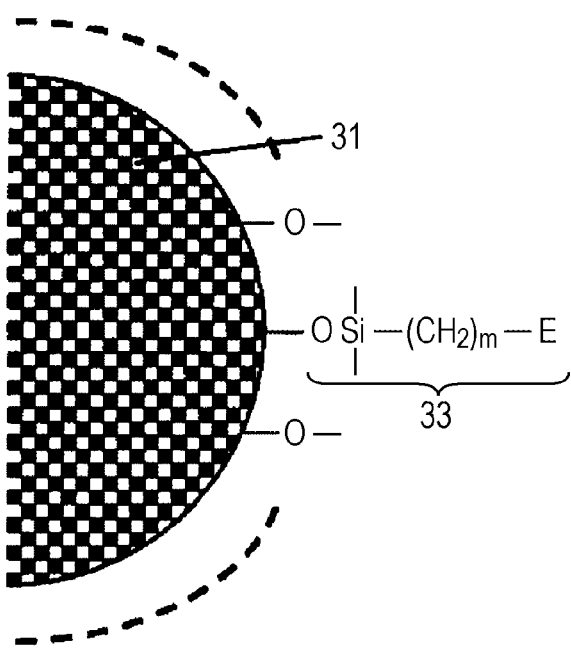

(see FIG. 5); D) bringing 2-methylimidazole into contact with the surface of the fluorescent zinc sulfide fine particles 31 on which the monomolecular film 33 of the second film compound has been formed to form a 2-methylimidazole monomolecular film 35 on the monomolecular film 33 of the second film compound through a coupling reaction between an epoxy group and an amino group, then bringing the fluorescent zinc sulfide fine particles 31 on which 2-methylimidazole monomolecular film 35 has been formed into contact with the glass plate 11 on which the monomolecular film 13 of the first film compound has been formed only in the pattern portion 22, thereby selectively fixing the fluorescent zinc sulfide fine particles 31 only on the surface of the pattern portion 22 via a bond formed by a coupling reaction between an epoxy group and an imino group (an example of a second coupling reactive group), and then removing unfixed fluorescent zinc sulfide fine particles 31; E) applying a solution containing an alkoxysilane compound having an epoxy group on the surface of the fluorescent zinc sulfide fine particles 41 to form a bond between an alkoxysilyl group (an example of a third bonding group) and a hydroxyl group of the surface of the fluorescent zinc sulfide fine particles 41, thereby forming a monomolecular film 43 of a third film compound on the surface thereof; F) bringing the fluorescent zinc sulfide fine particles 41 on which the monomolecular film 43 of the third film compound has been formed into contact with the surface of the fluorescent zinc sulfide fine particles 31, of the surface layer of the fluorescent fine particle layer, on which the 2-methylimidazole monomolecular film 35 has been formed, thereby binding and fixing the fluorescent zinc sulfide fine particles 41 on which the monomolecular film 43 of the third film compound has been formed on a fluorescent fine particle layer of the fluorescent zinc sulfide fine particles 31 on which the 2-methylimidazole monomolecular film 35 has been formed via a bond formed by a coupling reaction between an epoxy group and an imino group, and then removing unfixed fluorescent zinc sulfide fine particles 41; and G) bringing the fluorescent zinc sulfide fine particles 31 on which the 2-methylimidazole monomolecular film 35 has been formed into contact with the surface of the fluorescent zinc sulfide fine particles 41, of the surface layer of the fluorescent fine particle layer, on which the monomolecular film 43 of the third film compound has been formed to form a bond by a coupling reaction between an epoxy group and an imino group, thereby binding and fixing the fluorescent zinc sulfide fine particles 31 on which the 2-methylimidazole monomolecular film 35 has been formed on the fluorescent fine particle layer of the fluorescent zinc sulfide fine particles 41 on which the monomolecular film 43 of the third film compound has been formed, and then removing unfixed fluorescent zinc sulfide fine particles 31.

The steps A to G are the same as in the cases of the monolayer fluorescent fine particle film 1 according to the first embodiment and the multilayer fluorescent fine particle film 3 according to the second embodiment, and therefore will not be further described.

Also in the method for manufacturing a multilayer fluorescent fine particle film 4, the step H in which the steps F and G are performed repeatedly to form a fluorescent fine particle film that includes n fluorescent fine particle layers (n is an integer of 2 or more) may be further performed. In this case, the step H may be completed by step F or G.

In manufacturing the monolayer fluorescent fine particle film and the multilayer fluorescent fine particle film, a monomolecular film of a film compound that has a hydrocarbon or fluorocarbon group bound to the surface of the uppermost fluorescent fine particle layer may be further formed. A monomolecular film of a film compound having a hydrocarbon group and a fluorocarbon group acts as a surface protection film. Furthermore, since the monomolecular film dose not react with other functional groups, such as an epoxy group, an amino group, and an imino group, the monomolecular film inhibits the reactivity to the other fluorescent fine particles of the fluorescent fine particle layer. Thus, when fluorescent fine particle films having different luminescence properties (emission wavelength, excitation wavelength, etc.) are sequentially formed on different patterns in the same way, the monomolecular film can prevent fluorescent fine particles having different luminescence properties from being mixed with one another.

Figure 6:
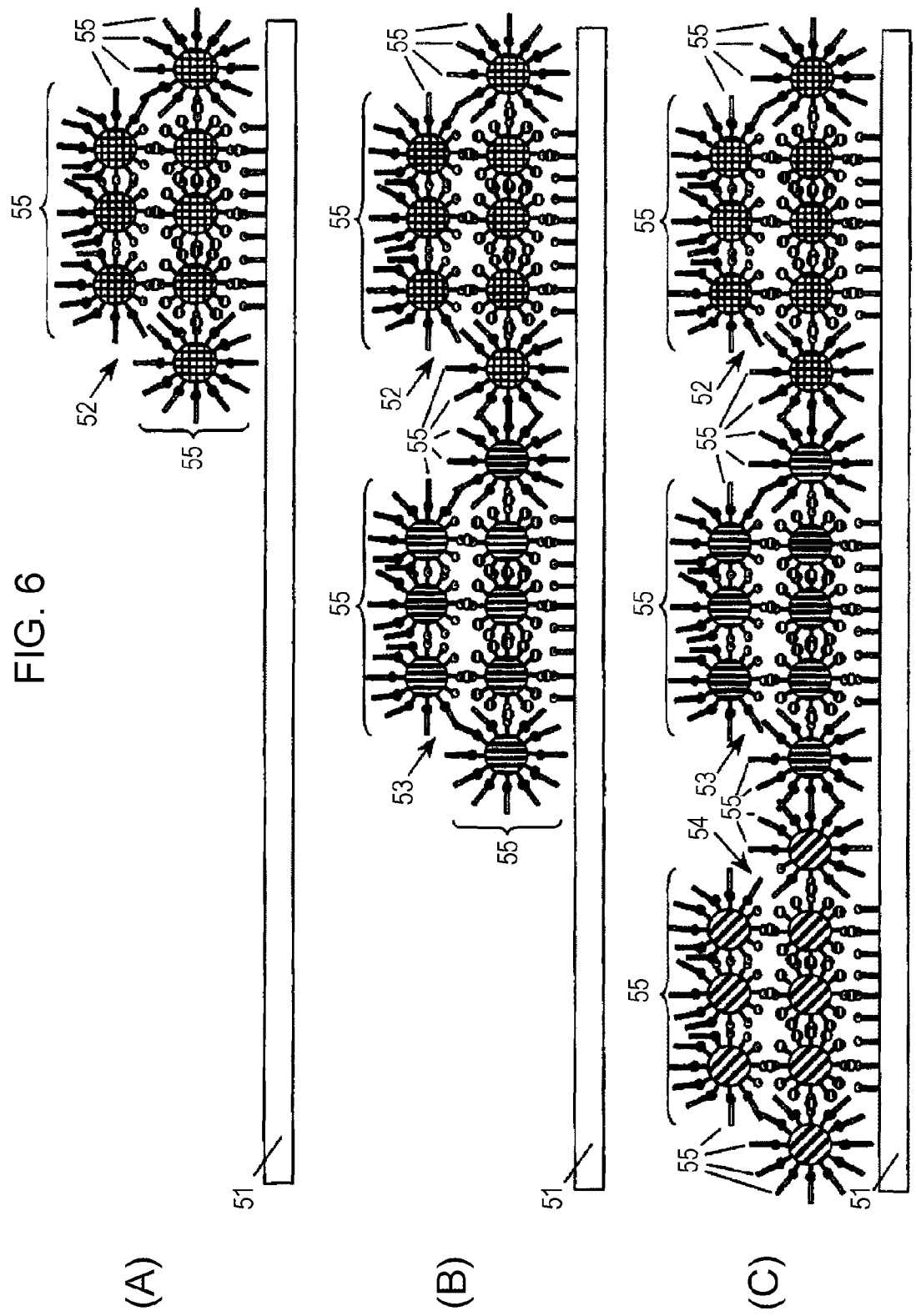
FIGS. 6(A) to 6(C) are schematic views illustrating the step of sequentially forming red, green, and blue multilayer fluorescent fine particle films on different pattern portions of a single substrate.

FIGS. 6(A), 6(B), and 6(C) are schematic explanatory views of the sequential steps of forming red, green, and blue fluorescent fine particle films, respectively, on different pattern portions of a single substrate. A red fluorescent fine particle film 52 (FIG. 6(A)), a green fluorescent fine particle film 53 (FIG. 6(B)), and a blue fluorescent fine particle film (FIG. 6(C)) are sequentially formed on differently pattern portions of a single substrate 51. Monomolecular films 55 of a film compound having a fluorocarbon group are formed on top of each of the fluorescent fine particle films 52, 53, and 54.

Examples of the film compound include halosilane compounds that have a halosilyl group, which can react with an epoxy group to form a covalent bond, and a fluorocarbon group, and fluoroalkyl iodides that can react with an imino group to form a covalent bond.

Examples of the halosilane compounds having a fluorocarbon group include the following compounds (41) to (46).

(41) $CF_3CH_2O(CH_2)_{15}SiCl_3$
(42) $CF_3(CH_2)_3Si(CH_3)_2(CH_2)_{15}SiCl_3$
(43) $CF_3(CF_2)_5(CH_2)_2Si(CH_3)_2(CH_2)_9SiCl_3$
(44) $CF_3(CF_2)_7(CH_2)_2Si(CH_3)_2(CH_2)_9SiCl_3$
(45) $CF_3COO(CH_2)_{15}SiCl_3$
(46) $CF_3(CF_2)_5(CH_2)_2SiCl_3$

When a monomolecular film of a film compound having an epoxy group is formed on top of the fluorescent fine particle layer, a photopolymerization initiator may be applied on the monomolecular film, and then the monomolecular film may be irradiated with light to cause ring-opening polymerization of epoxy groups, thereby deactivating the epoxy groups.

Examples of the photopolymerization initiator include cationic photopolymerization initiators, such as diaryliodonium salts. Examples of the light source include a high-pressure mercury lamp and a xenon lamp.

EXAMPLES

Example 1

Formation of Monomolecular Film of Film Compound Having Epoxy Group on Glass Plate:

A glass plate was washed and dried completely.

0.99 parts by weight of 3-glycidyloxypropyltrimethoxysilane (Chemical formula 8, manufactured by Shin-Etsu Chemical Co., Ltd.) and 0.01 parts by weight of dibutyltin bis(acetylacetonate) (condensation catalyst) were weighed and dissolved in 100 parts by weight of hexamethyldisiloxane solvent to prepare a reaction solution.

[Chemical formula 8]

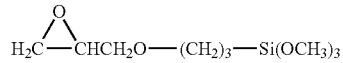

The reaction solution thus obtained was applied to the glass plate and was allowed to react in the air (at a relative humidity of 45%) for about two hours.

The glass plate was then washed with chloroform to remove the unreacted alkoxysilane compound and dibutyltin bis(acetylacetonate). A monomolecular film of a film compound having an epoxy group could be formed on the glass plate by this method.

Example 2

Patterning Treatment:

The monomolecular film of a film compound having an epoxy group formed on the glass plate in Example 1 was irradiated with a KrF excimer laser (having a wavelength of 248 nm, a pulse width of 10 ns, and a laser intensity of 0.15 J/cm$^2$) through a mask covering a pattern portion to be formed, thereby removing a portion of the monomolecular film having an epoxy group covering a portion other than the pattern portion by laser ablation. Patterning treatment could be performed by this method.

Alternatively, a cationic photopolymerization initiator Irgacure (registered trademark) 250 (a 3:1 mixture of (4-methylphenyl)[4-(2-methylpropyl)phenyl]iodonium hexafluorophosphate) and propylene carbonate, manufactured by Chiba Specialty Chemicals Co., Ltd.) diluted in methyl ethyl ketone (MEK) was applied to the surface of the monomolecular film of a film compound having an epoxy group formed on the glass plate. The monomolecular film was irradiated with far-ultraviolet rays through a mask covering a pattern portion to be formed, thereby causing ring-opening polymerization of epoxy groups of a portion of the monomolecular film having an epoxy group covering a portion other than the pattern portion. Patterning treatment could also be performed by this method.

Example 3

Formation of monomolecular film of film compound having epoxy group on surface of fluorescent zinc sulfide fine particles dry fluorescent zinc sulfide fine particles having a particle diameter of about 100 nm were dried completely.

0.99 parts by weight of 3-glycidyloxypropyltrimethoxysilane (Chemical formula 8) and 0.01 parts by weight of dibutyltin bis(acetylacetonate) (condensation catalyst) were weighed and dissolved in 100 parts by weight of hexamethyldisiloxane solvent to prepare a reaction solution.

The reaction solution thus obtained was mixed with the fluorescent zinc sulfide fine particles and was allowed to react in the air (at a relative humidity of 45%) for about two hours with stirring.

The fluorescent zinc sulfide fine particles were then washed with trichloroethylene to remove the unreacted alkoxysilane compound and dibutyltin bis(acetylacetonate). Since the fluorescent zinc sulfide fine particles have hydroxyl groups on the surface thereof, a monomolecular film of a film compound having an epoxy group could be formed by this method.

Example 4

Formation of 2-Methylimidazole Monomolecular Film on a Surface of Glass Plate:

A solution of 2-methylimidazole in ethanol was applied to the glass plate that has been subjected to patterning treatment in Example 2. Upon heating at 100° C., an amino group of 2-methylimidazole was allowed to react with an epoxy group to form a 2-methylimidazole monomolecular film. The glass plate was washed with ethanol to remove unreacted 2-methylimidazole.

Example 5

Formation of 2-Methylimidazole Monomolecular Film on Surfaces of Fluorescent Zinc Sulfide Fine Particles:

The fluorescent zinc sulfide fine particles on which the 2-methylimidazole monomolecular film has been formed in Example 3 was dispersed in a solution of 2-methylimidazole in ethanol. Upon heating at 100° C., an amino group of 2-methylimidazole was allowed to react with an epoxy group to form a 2-methylimidazole monomolecular film on a surface of the fluorescent zinc sulfide fine particles. The glass plate was then washed with ethanol to remove unreacted 2-methylimidazole.

Example 6

Preparation of Fluorescent Zinc Sulfide Fine Particle Film: (1)

An ethanol dispersion of the fluorescent zinc sulfide fine particles on which a monomolecular film of a film compound having an epoxy group has been formed in Example 3 was applied on the glass plate on which the 2-methylimidazole monomolecular film has been formed in Example 4. The glass plate was heated at 100° C. After the reaction, the glass plate was washed with ethanol to remove unreacted fluorescent zinc sulfide fine particles.

An ethanol dispersion of the fluorescent zinc sulfide fine particles on which a 2-methylimidazole monomolecular film was further formed in Example 5 was further applied on the surface of the fluorescent zinc sulfide fine particle film having a fluorescent fine particle layer. The glass plate was heated at 100° C. After the reaction, the fluorescent zinc sulfide fine particle film was washed with ethanol to remove unreacted fluorescent zinc sulfide fine particles, thus yielding a fluorescent zinc sulfide fine particle film having two layered fluorescent fine particle layers.

Example 7

Preparation of Fluorescent Fine Particle Film (2):

An ethanol dispersion of fluorescent zinc sulfide fine particles on which a 2-methylimidazole monomolecular film has been further formed were applied on the epoxidized glass plate that has been subjected to patterning treatment in Example 2. The glass plate was heated at 100° C. After the reaction, the glass plate was washed with water to remove unreacted fluorescent zinc sulfide fine particles.

An ethanol dispersion of the fluorescent zinc sulfide fine particles on which a 2-methylimidazole monomolecular film was formed in Example 3 was further applied on the surface of the fluorescent zinc sulfide fine particle film having a fluorescent zinc sulfide fine particle layer. The glass plate was heated at 100° C. After the reaction, the fluorescent zinc sulfide fine particle film was washed with water to remove unreacted fluorescent zinc sulfide fine particles, thus yielding a fluorescent zinc sulfide fine particle film having two layered fluorescent zinc sulfide fine particle layers.

REFERENCE NUMERALS 1 and 2 monolayer fluorescent fine particle film
3 and 4 multilayer fluorescent fine particle film
11 glass plate 12 hydroxyl group
13 monomolecular film of first film compound
15 2-methylimidazole monomolecular film
21 mask
22 pattern portion
23 removed first film compound
24 pattern portion
31 fluorescent zinc sulfide fine particles
32 hydroxyl group
33 monomolecular film of second film compound
35 2-methylimidazole monomolecular film
41 fluorescent zinc sulfide fine particles
45 2-methylimidazole monomolecular film
51 substrate
52 red fluorescent fine particle film
53 green fluorescent fine particle film
54 blue fluorescent fine particle film
55 monomolecular film of film compound having fluorocarbon group

The invention claimed is:

1. A patterned fluorescent film, comprising:
a substrate;
a plurality of first alkoxysilane compounds linked to the substrate and configured to form a first film pattern on the substrate, each first alkoxysilane compound having a first end covalently linked to the substrate and having a first reactive group on a second, opposite end of the first alkoxysilane compound, the first reactive group being selected from the group consisting of epoxide, amine, and imine;
a plurality of fluorescent particles;
a plurality of second alkoxysilane compounds linked to each of the fluorescent particles, and configured to form a second film on each of the fluorescent particles, each second alkoxysilane compound having a first end covalently linked to a fluorescent particle and having a second reactive group on a second, opposite end of the second alkoxysilane compound, the second reactive group being selected from the group consisting of epoxide, amine, and imine; and
a plurality of first crosslinking agents, the first crosslinking agents, each having a third reactive group on a first end and a fourth reactive group on a second, opposite end, each of the plurality of first crosslinking agents being selected from the group consisting of: compounds having two or more epoxy groups; compounds having two or more isocyanate groups; an imidazole derivative selected from the group consisting of 2-methylimidazole, 2-undecylimidazole, 2-pentadecylimidazole, 2-methyl-4-ethylimidazole, 2-phenylimidazole, 2-phenyl-4-ethylimidazole, 2-phenyl-4-methyl-5-(hydroxymethyl)imidazole, and 2-phenyl-4,5-bis(hydroxymethyl)imidazole; imidazole-metal complexes; heterocyclic compounds including at least two nitrogens selected from the group consisting of melamine, isocyanuric acid, triazine, barbituric acid, parabanic acid, uracil, and thymine; acid anhydride compounds; dicyandiamide compounds; and phenol derivative compounds,
wherein the plurality of fluorescent particles are coupled to the substrate via a reaction between the third and fourth reactive groups of the plurality of first crosslinking agents and the first and second reactive groups of the plurality of first alkoxysilane compounds and the plurality of second alkoxysilane compounds to form the patterned fluorescent film, and
wherein if the first and second reactive groups are an epoxy group, then the third and fourth reactive groups are one of an amino or imino group, or wherein if the first and second reactive groups are one of an amino or imino group, then the third and fourth reactive groups are an epoxy group.

2. The patterned fluorescent film of claim 1, comprising:
a plurality of second fluorescent particles;
a plurality of third alkoxysilane compounds linked to the second particles so as to form a third film on the second particle and each third alkoxysilane compound having a first end covalently linked to the substrate and having a fifth reactive group on a second, opposite end of the third alkoxysilane compound, the fifth reactive group being selected from the group consisting of epoxide, amine, and imine; and
a plurality of second crosslinking agents each having a sixth reactive group on a first end and a seventh reactive group on a second, opposite end, the sixth and seventh reactive groups being selected from the group consisting of epoxide, amine, and imine,
wherein the sixth or seventh reactive groups of the plurality of second crosslinking agents react with fifth reactive groups of the third alkoxysilane compounds to link the plurality of second fluorescent particles to the plurality of first fluorescent particles and/or the sixth or seventh reactive groups reactive with at least some of the fifth reactive groups that are not reacted to link the plurality of second fluorescent particles to the plurality of first fluorescent particles to cap the fifth reactive groups of the third alkoxysilane compounds, and
wherein if the fifth reactive group is an epoxy group, then the sixth and seventh reactive groups are one of an amino or imino group, or wherein if the fifth reactive group is one of an amino or imino group, then the sixth and seventh reactive groups are an epoxy group.

3. The patterned fluorescent film of claim 1, comprising a plurality of fluorescent fine particle film layers formed into different patterns on the substrate.

4. The patterned fluorescent film of claim 2, wherein:
the pluralities of first and second alkoxysilane compounds are the same;
the pluralities of first, second and third alkoxysilane compounds are the same;
the pluralities of first and third alkoxysilane compounds are the same; or
the pluralities of second and third alkoxysilane compounds are the same.

5. The patterned fluorescent film of claim 1, comprising:
the substrate having a first active hydrogen group;
the plurality of first alkoxysilane compounds being linked to the substrate through the first active hydrogen group;
the plurality of fluorescent particles each having a second active hydrogen group; and
the plurality of second alkoxysilane compounds being linked to the plurality of fluorescent particles through the second active hydrogen group.

6. The patterned fluorescent film of claim 5, comprising:
the plurality of second fluorescent particles having a third active hydrogen group;
the plurality of third alkoxysilane compounds linked to the second fluorescent particles through the third active hydrogen group.

7. The patterned fluorescent film of claim 1, comprising:
a plurality of deactivated first alkoxysilane compounds linked to the substrate and each of the plurality of deactivated first alkoxysilane compounds having the first reactive group, which has been deactivated.

8. The patterned fluorescent film of claim 1, comprising:
a plurality of deactivated second alkoxysilane compounds linked to the plurality of fluorescent particles, wherein each of the plurality of deactivated second alkoxysilane compounds has the second reactive group, which has been deactivated.

9. The patterned fluorescent film of claim 1, the patterned fluorescent particle film having red, green, and blue fluorescent fine particles arranged in a specific pattern.

10. A display apparatus having the patterned fluorescent film of claim 1.

11. A display apparatus having the patterned fluorescent film of claim 9.

12. A television receiver having the patterned fluorescent film of claim 1.

13. A patterned fluorescent film, comprising:
a substrate;
a plurality of first film compounds linked to the substrate and configured to form a first film pattern on the substrate, each first film compound having a first end covalently linked to the substrate and having a first reactive group on a second, opposite end of the first film compound, the first reactive group being selected from the group consisting of epoxide, isocyanate, amine, and imine;
a plurality of fluorescent particles;
a plurality of second film compounds linked to each of the fluorescent particles, and configured to form a second film on each of the fluorescent particles, each second film compound having a first end covalently linked to a fluorescent particle and having a second reactive group on a second, opposite end of the second film compound, the second reactive group being selected from the group consisting of epoxide, isocyanate, amine, and imine; and
a plurality of first crosslinking agents each having a third reactive group on a first end and a fourth reactive group on a second, opposite end, each of the first crosslinking agents being selected from the group consisting of: compounds having two or more epoxy groups; compounds having two or more isocyanate groups; an imidazole derivative
selected from the group consisting of 2-methylimidazole, 2-undecylimidazole, 2-pentadecylimidazole, 2-methyl-4-ethylimidazole, 2-phenylimidazole, 2-phenyl-4-ethylimidazole, 2-phenyl-4-methyl-5-(hydroxymethyl)imidazole, and 2-phenyl-4,5-bis(hydroxymethyl)imidazole; imidazole-metal complexes; heterocyclic compounds including at least two nitrogens selected from the group consisting of melamine, isocyanuric acid, triazine, barbituric acid, parabanic acid, uracil, and thymine; acid anhydride compounds; dicyandiamide compounds; and phenol derivative compounds;
wherein the plurality of fluorescent particles are coupled to the substrate via a reaction between the third and fourth reactive groups of the plurality of first crosslinking agents and the first and second reactive groups of the plurality of first film compounds and the plurality of second film compounds to form the patterned fluorescent film.

14. The patterned fluorescent film of claim 13, wherein the first crosslinking agents comprise a heterocyclic compound including at least two nitrogens selected from the group consisting of melamine, isocyanuric acid, triazine, barbituric acid, parabanic acid, uracil, and thymine.

15. The patterned fluorescent film of claim 13, wherein at least one of the first or second film compounds comprises an alkoxysilane compound.

16. The patterned fluorescent film of claim 13, wherein the substrate comprises a gold plating layer, the plurality of first film compounds being selected from the group consisting of a thiol and a triazinethiol derivative.

17. The patterned fluorescent film of claim 13, wherein the fluorescent particles comprise fluorescent sulfide particles, the second film compound being a phosphine compound.

18. A patterned fluorescent film, comprising:
a substrate;
a plurality of first alkoxysilane compounds linked to the substrate and configured to form a first film pattern on the substrate, each first alkoxysilane compound having a first end covalently linked to the substrate and having a first reactive group on a second, opposite end of the first alkoxysilane compound, the first reactive group being selected from the group consisting of epoxide, amine, and imine;
a plurality of fluorescent particles;
a plurality of second alkoxysilane compounds linked to each of the fluorescent particles, and configured to form a second film on each of the fluorescent particles, each second alkoxysilane compound having a first end covalently linked to a fluorescent particle and having a second reactive group on a second, opposite end of the second alkoxysilane compound, the second reactive group being selected from the group consisting of epoxide, amine, and imine; and
a plurality of first crosslinking agents, the first crosslinking agents forming a monomolecular film, each having a third reactive group on a first end and a fourth reactive group on a second, opposite end, the third and fourth reactive groups being selected from the group consisting of epoxide, amine, and imine
wherein the plurality of fluorescent particles are coupled to the substrate via a reaction between the third and fourth reactive groups of the plurality of first crosslinking agents and the first and second reactive groups of the plurality of first alkoxysilane compounds and the plurality of second alkoxysilane compounds to form the patterned fluorescent film, and
wherein if the first and second reactive groups are an epoxy group, then the third and fourth reactive groups are one of an amino or imino group, or wherein if the first and second reactive groups are one of an amino or imino group, then the third and fourth reactive groups are an epoxy group.

* * * * *

UNITED STATES PATENT AND TRADEMARK OFFICE
CERTIFICATE OF CORRECTION

PATENT NO. : 8,951,627 B2  
APPLICATION NO. : 12/663082  
DATED : February 10, 2015  
INVENTOR(S) : Ogawa It is certified that error appears in the above-identified patent and that said Letters Patent is hereby corrected as shown below:

In the Specification

In Column 1, below Title, insert -- CROSS-REFERENCE TO RELATED APPLICATION
The present application is a national phase application filing under 35 U.S.C. §371 of International Application No. PCT/JP2008/060397, filed on June 5, 2008, also claims priority from the Foreign Application JP 2007-150850 filed on June 6, 2007. --.

In Column 13, Line 64, delete "an silicon" and insert -- a silicon --, therefor.

In Column 14, Line 30, delete "21," and insert -- 31, --, therefor.

In Column 14, Line 33, delete "21." and insert -- 31. --, therefor.

In Column 26, Line 3, delete "dose" and insert -- does --, therefor.

In Column 27, Line 26, delete "Ltd.)" and insert -- Ltd. --, therefor.

In Column 27, Line 41, delete "dry" and insert -- Dry --, therefor.

In Column 28, Lines 21-22, delete "Film:(1)" and insert -- Film(1): --, therefor.

In the Claims

In Column 32, Line 43, in Claim 18, delete "imine" and insert -- imine; --, therefor.

Signed and Sealed this
Twenty-eighth Day of July, 2015

Michelle K. Lee
*Director of the United States Patent and Trademark Office*